US012467882B2

(12) United States Patent
Ollier

(10) Patent No.: US 12,467,882 B2
(45) Date of Patent: Nov. 11, 2025

(54) SYSTEMS AND METHODS FOR MONITORING OUTPUT ENERGY OF A HIGH-ENERGY X-RAY SOURCE

(71) Applicant: Rapiscan Holdings, Inc., Hawthorne, CA (US)

(72) Inventor: James Ollier, Huyton (GB)

(73) Assignee: Rapiscan Holdings, Inc., Torrance, CA (US)

( * ) Notice: Subject to any disclaimer, the term of this patent is extended or adjusted under 35 U.S.C. 154(b) by 170 days.

(21) Appl. No.: 18/537,617

(22) Filed: Dec. 12, 2023

(65) Prior Publication Data

US 2024/0310300 A1     Sep. 19, 2024

Related U.S. Application Data

(60) Provisional application No. 63/453,028, filed on Mar. 17, 2023.

(51) Int. Cl.
*A61B 6/00*         (2024.01)
*A61B 6/06*         (2006.01)
(Continued)

(52) U.S. Cl.
CPC .............. *G01N 23/04* (2013.01); *A61B 6/06* (2013.01); *A61B 6/4078* (2013.01); *A61B 6/4092* (2013.01); *A61B 6/4241* (2013.01); *G01N 2223/1016* (2013.01); *G01N 2223/304* (2013.01); *G01N 2223/306* (2013.01); *G01N 2223/316* (2013.01); *G01N 2223/33* (2013.01)

(58) Field of Classification Search
CPC ....... A61B 6/06; A61B 6/4078; A61B 6/4092; A61B 6/4241; G01N 2223/1016; G01N 2223/304; G01N 2223/306; G01N 2223/316; G01N 2223/33; G01N 23/04
See application file for complete search history.

(56) References Cited

U.S. PATENT DOCUMENTS 2,636,619 A     4/1953   Alexander
3,275,831 A     9/1966   Martin
(Continued)

FOREIGN PATENT DOCUMENTS

AT      406586 T     9/2008
AT      553401 T     4/2012
(Continued)

OTHER PUBLICATIONS

International Search Report for PCT/US23/83674, Apr. 23, 2024.
(Continued)

*Primary Examiner* — Mark R Gaworecki
(74) *Attorney, Agent, or Firm* — Novel IP

(57) ABSTRACT

Systems and methods to monitor output energy of an X-ray source being used to emit a fan beam for scanning an object in a scanning system include a segmented detector positioned between a target of the X-ray source and the object. The segmented detector has at least two segments that are placed to cover at least two angular ranges of the fan beam and generate corresponding two sets of energy distribution data. A ratio is determined based on the two sets of energy distribution data in order to determine an initial electron energy and an end-point energy of the X-ray source based on the ratio.

34 Claims, 8 Drawing Sheets

(51) Int. Cl.
*A61B 6/40* (2024.01)
*A61B 6/42* (2024.01)
*G01N 23/04* (2018.01)

(56) References Cited

U.S. PATENT DOCUMENTS

| | | | |
|---|---|---|---|
| 3,374,355 A | 3/1968 | Parratt | |
| 3,439,166 A | 4/1969 | Chope | |
| 3,837,502 A | 9/1974 | Hornagold | |
| 3,904,923 A | 9/1975 | Schwartz | |
| 3,919,467 A | 11/1975 | Peugeot | |
| 4,164,138 A | 8/1979 | Burkhart | |
| 4,239,969 A | 12/1980 | Galetta | |
| 4,658,408 A | 4/1987 | Amor | |
| 4,831,260 A | 5/1989 | Dibianca | |
| 4,998,270 A | 3/1991 | Scheid | |
| 5,014,293 A | 5/1991 | Boyd | |
| 5,040,199 A | 8/1991 | Stein | |
| 5,041,728 A | 8/1991 | Spacher | |
| 5,065,418 A | 11/1991 | Bermbach | |
| 5,181,234 A | 1/1993 | Smith | |
| 5,185,778 A | 2/1993 | Magram | |
| 5,197,088 A | 3/1993 | Vincent | |
| 5,202,932 A | 4/1993 | Cambier | |
| 5,259,012 A | 11/1993 | Baker | |
| 5,319,696 A | 6/1994 | Abdel-Malek | |
| 5,321,271 A | 6/1994 | Schonberg | |
| 5,363,940 A | 11/1994 | Fahrion | |
| 5,394,452 A * | 2/1995 | Swerdloff | G21K 5/10 |
| | | | 378/65 |
| 5,418,372 A | 5/1995 | Schonberg | |
| 5,493,596 A | 2/1996 | Annis | |
| 5,503,424 A | 4/1996 | Agopian | |
| 5,600,303 A | 2/1997 | Husseiny | |
| 5,606,167 A | 2/1997 | Miller | |
| 5,661,377 A | 8/1997 | Mishin | |
| 5,692,028 A | 11/1997 | Geus | |
| 5,692,029 A | 11/1997 | Husseiny | |
| 5,838,759 A | 11/1998 | Armistead | |
| 5,842,578 A | 12/1998 | Cordeiro | |
| 5,909,478 A | 6/1999 | Polichar | |
| 5,910,973 A | 6/1999 | Grodzins | |
| 5,940,468 A | 8/1999 | Huang | |
| 5,949,811 A | 9/1999 | Baba | |
| 5,974,111 A | 10/1999 | Krug | |
| 6,056,671 A | 5/2000 | Marmer | |
| 6,067,344 A | 5/2000 | Grodzins | |
| 6,081,580 A | 6/2000 | Grodzins | |
| 6,151,381 A | 11/2000 | Grodzins | |
| 6,192,104 B1 | 2/2001 | Adams | |
| 6,216,540 B1 | 4/2001 | Nelson | |
| 6,220,099 B1 | 4/2001 | Marti | |
| 6,249,567 B1 | 6/2001 | Rothschild | |
| 6,292,533 B1 | 9/2001 | Swift | |
| 6,301,327 B1 | 10/2001 | Martens | |
| 6,320,933 B1 | 11/2001 | Grodzins | |
| 6,347,132 B1 | 2/2002 | Annis | |
| 6,418,194 B1 | 7/2002 | McPherson | |
| 6,424,695 B1 | 7/2002 | Grodzins | |
| 6,438,201 B1 | 8/2002 | Mazess | |
| 6,459,761 B1 | 10/2002 | Grodzins | |
| 6,459,764 B1 | 10/2002 | Chalmers | |
| 6,504,898 B1 | 1/2003 | Kotler | |
| 6,507,027 B1 | 1/2003 | Kojima | |
| 6,542,574 B2 | 4/2003 | Grodzins | |
| 6,542,580 B1 | 4/2003 | Carver | |
| 6,546,072 B1 | 4/2003 | Chalmers | |
| 6,552,346 B2 | 4/2003 | Verbinski | |
| 6,614,872 B2 | 9/2003 | Bueno | |
| 6,658,087 B2 | 12/2003 | Chalmers | |
| 6,665,373 B1 | 12/2003 | Kotowski | |
| 6,702,459 B2 | 3/2004 | Barnes | |
| 6,713,773 B1 | 3/2004 | Lyons | |
| 6,714,620 B2 | 3/2004 | Caflisch | |
| 6,843,599 B2 | 1/2005 | Le | |
| 6,847,040 B2 | 1/2005 | Strommer | |
| 6,920,197 B2 | 7/2005 | Kang | |
| 6,924,487 B2 | 8/2005 | Bolozdynya | |
| 6,928,141 B2 | 8/2005 | Carver | |
| 6,940,071 B2 | 9/2005 | Ramsden | |
| 6,944,263 B2 | 9/2005 | Xiao | |
| 7,010,094 B2 | 3/2006 | Grodzins | |
| 7,039,159 B2 | 5/2006 | Muenchau | |
| 7,046,768 B1 | 5/2006 | Gilevich | |
| 7,095,326 B2 | 8/2006 | Young | |
| 7,099,434 B2 | 8/2006 | Adams | |
| RE39,396 E | 11/2006 | Swift | |
| 7,151,447 B1 | 12/2006 | Willms | |
| 7,202,478 B2 | 4/2007 | Ramsden | |
| 7,203,276 B2 | 4/2007 | Arsenault | |
| 7,207,713 B2 | 4/2007 | Lowman | |
| 7,215,737 B2 | 5/2007 | Li | |
| 7,215,738 B2 | 5/2007 | Muenchau | |
| 7,218,704 B1 | 5/2007 | Adams | |
| 7,239,245 B2 | 7/2007 | Kang | |
| 7,244,947 B2 | 7/2007 | Polichar | |
| 7,272,208 B2 | 9/2007 | Yatsenko | |
| 7,302,035 B2 | 11/2007 | Hu | |
| 7,322,745 B2 | 1/2008 | Agrawal | |
| 7,352,843 B2 | 4/2008 | Hu | |
| 7,352,844 B1 | 4/2008 | Muenchau | |
| 7,366,282 B2 | 4/2008 | Peschmann | |
| 7,369,642 B2 | 5/2008 | Eilbert | |
| 7,369,643 B2 | 5/2008 | Kotowski | |
| 7,372,040 B2 | 5/2008 | Polichar | |
| 7,372,944 B2 | 5/2008 | Bernhardt | |
| 7,379,530 B2 | 5/2008 | Hoff | |
| 7,386,093 B2 | 6/2008 | Wu | |
| 7,388,209 B1 | 6/2008 | Gormley | |
| 7,391,849 B2 | 6/2008 | Smith | |
| 7,397,891 B2 | 7/2008 | Johnson | |
| 7,399,976 B2 | 7/2008 | Kang | |
| 7,400,701 B1 | 7/2008 | Cason | |
| 7,400,706 B2 | 7/2008 | Li | |
| 7,417,440 B2 | 8/2008 | Peschmann | |
| 7,418,077 B2 | 8/2008 | Gray | |
| 7,453,987 B1 | 11/2008 | Richardson | |
| 7,456,780 B1 | 11/2008 | Garren | |
| 7,470,914 B2 | 12/2008 | Li | |
| 7,471,764 B2 | 12/2008 | Kaval | |
| 7,483,510 B2 | 1/2009 | Carver | |
| 7,486,768 B2 | 2/2009 | Allman | |
| 7,499,522 B2 | 3/2009 | Chen | |
| 7,504,635 B2 | 3/2009 | Ramsden | |
| 7,505,556 B2 | 3/2009 | Chalmers | |
| 7,508,908 B2 | 3/2009 | Hu | |
| 7,512,212 B2 | 3/2009 | Li | |
| 7,517,149 B2 | 4/2009 | Agrawal | |
| 7,519,148 B2 | 4/2009 | Kotowski | |
| 7,525,101 B2 | 4/2009 | Grodzins | |
| 7,526,064 B2 | 4/2009 | Akery | |
| 7,538,325 B2 | 5/2009 | Mishin | |
| 7,547,887 B2 | 6/2009 | Ramsden | |
| 7,555,099 B2 | 6/2009 | Rothschild | |
| 7,570,737 B2 | 8/2009 | Kang | |
| 7,579,845 B2 | 8/2009 | Peschmann | |
| 7,580,505 B2 | 8/2009 | Kang | |
| 7,593,506 B2 | 9/2009 | Cason | |
| 7,593,510 B2 | 9/2009 | Rothschild | |
| 7,596,275 B1 | 9/2009 | Richardson | |
| 7,634,055 B2 | 12/2009 | Hu | |
| 7,647,189 B2 | 1/2010 | Kang | |
| 7,660,388 B2 | 2/2010 | Gray | |
| 7,663,109 B2 | 2/2010 | Kang | |
| 7,683,336 B2 | 3/2010 | Ramsden | |
| 7,684,538 B2 | 3/2010 | Morton | |
| 7,684,541 B2 | 3/2010 | Wang | |
| 7,702,070 B2 | 4/2010 | Kang | |
| 7,709,818 B2 | 5/2010 | Matsuda | |
| 7,720,195 B2 | 5/2010 | Allman | |
| 7,722,251 B2 | 5/2010 | Kang | |
| 7,724,868 B2 | 5/2010 | Morton | |
| 7,742,568 B2 | 6/2010 | Smith | |
| 7,760,852 B2 | 7/2010 | Chen | |

(56) References Cited

U.S. PATENT DOCUMENTS

| | | |
|---|---|---|
| 7,769,133 B2 | 8/2010 | Carver |
| 7,783,004 B2 | 8/2010 | Kotowski |
| 7,783,005 B2 | 8/2010 | Kaval |
| 7,807,964 B2 | 10/2010 | Li |
| 7,809,104 B2 | 10/2010 | Foland |
| 7,817,775 B2 | 10/2010 | Kang |
| 7,817,776 B2 | 10/2010 | Agrawal |
| 7,820,973 B2 | 10/2010 | Ruan |
| 7,852,981 B2 | 12/2010 | Luo |
| 7,856,081 B2 | 12/2010 | Peschmann |
| 7,860,213 B2 | 12/2010 | Akery |
| 7,864,920 B2 | 1/2011 | Rothschild |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,975 B2 | 4/2011 | Zhang |
| 7,928,400 B1 | 4/2011 | Diawara |
| 7,929,663 B2 | 4/2011 | Morton |
| 7,942,576 B2 | 5/2011 | Zhao |
| 7,947,957 B2 | 5/2011 | Ruan |
| 7,949,101 B2 | 5/2011 | Morton |
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 7,995,707 B2 | 8/2011 | Rothschild |
| 8,013,297 B2 | 9/2011 | Peng |
| 8,054,937 B2 | 11/2011 | Langeveld |
| 8,054,938 B2 | 11/2011 | Kaval |
| 8,059,781 B2 | 11/2011 | Agrawal |
| 8,073,099 B2 | 12/2011 | Niu |
| 8,084,748 B2 | 12/2011 | Peng |
| 8,085,897 B2 | 12/2011 | Morton |
| 8,094,784 B2 | 1/2012 | Morton |
| 8,129,691 B2 | 3/2012 | Hu |
| 8,135,110 B2 | 3/2012 | Morton |
| 8,138,770 B2 | 3/2012 | Peschmann |
| 8,170,177 B2 | 5/2012 | Akery |
| 8,204,173 B2 | 6/2012 | Betcke |
| 8,217,365 B2 | 7/2012 | Chen |
| 8,223,919 B2 | 7/2012 | Morton |
| 8,243,876 B2 | 8/2012 | Morton |
| 8,247,776 B2 | 8/2012 | Peng |
| 8,275,091 B2 | 9/2012 | Morton |
| 8,288,718 B2 | 10/2012 | Li |
| 8,319,188 B2 | 11/2012 | Ramsden |
| 8,325,871 B2 | 12/2012 | Grodzins |
| 8,331,535 B2 | 12/2012 | Morton |
| 8,345,819 B2 | 1/2013 | Mastronardi |
| 8,356,937 B2 | 1/2013 | Kotowski |
| 8,374,310 B2 | 2/2013 | Kang |
| 8,374,993 B2 | 2/2013 | Ramsden |
| 8,384,016 B2 | 2/2013 | Ramsden |
| 8,385,501 B2 | 2/2013 | Allman |
| 8,389,942 B2 | 3/2013 | Morton |
| 8,396,189 B2 | 3/2013 | Kang |
| 8,428,217 B2 | 4/2013 | Peschmann |
| 8,433,036 B2 | 4/2013 | Morton |
| 8,437,448 B2 | 5/2013 | Langeveld |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,457,275 B2 | 6/2013 | Akery |
| 8,477,902 B2 | 7/2013 | Li |
| 8,483,356 B2 | 7/2013 | Bendahan |
| 8,491,189 B2 | 7/2013 | Kotowski |
| 8,503,605 B2 | 8/2013 | Morton |
| 8,503,606 B2 | 8/2013 | Rothschild |
| 8,532,823 B2 | 9/2013 | McElroy |
| 8,552,722 B2 | 10/2013 | Lionheart |
| 8,559,592 B2 | 10/2013 | Betcke |
| 8,579,506 B2 | 11/2013 | Morton |
| 8,582,857 B2 | 11/2013 | Chen |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,679,409 B2 | 3/2014 | Zhang |
| 8,687,765 B2 | 4/2014 | Kotowski |
| 8,690,427 B2 | 4/2014 | Mastronardi |
| 8,735,833 B2 | 5/2014 | Morton |
| 8,750,452 B2 | 6/2014 | Kaval |
| 8,774,357 B2 | 7/2014 | Morton |
| 8,781,067 B2 | 7/2014 | Langeveld |
| 8,798,232 B2 | 8/2014 | Bendahan |
| 8,804,899 B2 | 8/2014 | Morton |
| 8,824,632 B2 | 9/2014 | Mastronardi |
| 8,824,637 B2 | 9/2014 | Morton |
| 8,831,176 B2 | 9/2014 | Morton |
| 8,831,305 B2 | 9/2014 | Zhang |
| 8,837,669 B2 | 9/2014 | Morton |
| 8,837,670 B2 | 9/2014 | Akery |
| 8,840,303 B2 | 9/2014 | Morton |
| 8,842,808 B2 | 9/2014 | Rothschild |
| 8,859,981 B1 | 10/2014 | Stoian |
| 8,861,684 B2 | 10/2014 | Al-Kofahi |
| 8,885,794 B2 | 11/2014 | Morton |
| 8,908,831 B2 | 12/2014 | Bendahan |
| 8,913,707 B2 | 12/2014 | Kang |
| 8,929,509 B2 | 1/2015 | Morton |
| 8,958,526 B2 | 2/2015 | Morton |
| 8,971,485 B2 | 3/2015 | Morton |
| 8,971,487 B2 | 3/2015 | Mastronardi |
| 8,983,033 B2 | 3/2015 | Chen |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,096 B2 | 4/2015 | Allman |
| 9,020,103 B2 | 4/2015 | Grodzins |
| 9,025,731 B2 | 5/2015 | Kotowski |
| 9,036,779 B2 | 5/2015 | Morton |
| 9,037,342 B2 | 5/2015 | Shi |
| 9,042,511 B2 | 5/2015 | Peschmann |
| 9,046,465 B2 | 6/2015 | Thompson |
| 9,046,613 B2 | 6/2015 | Ramsden |
| 9,048,061 B2 | 6/2015 | Morton |
| 9,052,271 B2 | 6/2015 | Grodzins |
| 9,052,403 B2 | 6/2015 | Morton |
| 9,057,679 B2 | 6/2015 | Morton |
| 9,081,099 B2 | 7/2015 | Kang |
| 9,086,497 B2 | 7/2015 | Bendahan |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,121,958 B2 | 9/2015 | Morton |
| 9,128,200 B2 | 9/2015 | Muenster |
| 9,146,201 B2 | 9/2015 | Schubert |
| 9,158,027 B2 | 10/2015 | Morton |
| 9,158,030 B2 | 10/2015 | Morton |
| 9,182,515 B2 | 11/2015 | Stoian |
| 9,183,647 B2 | 11/2015 | Morton |
| 9,208,988 B2 | 12/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,257,208 B2 | 2/2016 | Rommel |
| 9,263,225 B2 | 2/2016 | Morton |
| 9,268,027 B2 | 2/2016 | Kang |
| 9,268,044 B2 | 2/2016 | Ramsden |
| 9,268,058 B2 | 2/2016 | Peschmann |
| 9,274,065 B2 | 3/2016 | Morton |
| 9,279,901 B2 | 3/2016 | Akery |
| 9,285,488 B2 | 3/2016 | Arodzero |
| 9,285,498 B2 | 3/2016 | Carver |
| 9,291,582 B2 | 3/2016 | Grodzins |
| 9,310,322 B2 | 4/2016 | Panesar |
| 9,310,323 B2 | 4/2016 | Bendahan |

(56) References Cited

U.S. PATENT DOCUMENTS

| | | |
|---|---|---|
| 9,316,760 B2 | 4/2016 | Bendahan |
| 9,329,285 B2 | 5/2016 | Gozani |
| 9,332,624 B2 | 5/2016 | Morton |
| 9,417,060 B1 | 8/2016 | Schubert |
| 9,420,677 B2 | 8/2016 | Morton |
| 9,442,082 B2 | 9/2016 | Morton |
| 9,465,119 B2 | 10/2016 | Manslow |
| 9,466,456 B2 | 10/2016 | Rommel |
| 9,535,019 B1 | 1/2017 | Rothschild |
| 9,535,177 B2 | 1/2017 | Ramsden |
| 9,541,510 B2 | 1/2017 | Arodzero |
| 9,568,637 B2 | 2/2017 | Stoian |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,658,343 B2 | 5/2017 | Arodzero |
| 9,675,306 B2 | 6/2017 | Morton |
| 9,688,517 B2 | 6/2017 | Morton |
| 9,714,920 B2 | 7/2017 | Lionheart |
| 9,720,111 B2 | 8/2017 | Ramsden |
| 9,726,619 B2 | 8/2017 | Thompson |
| 9,747,678 B2 | 8/2017 | Chen |
| 9,747,705 B2 | 8/2017 | Morton |
| 9,817,151 B2 | 11/2017 | Morton |
| 9,880,315 B2 | 1/2018 | Stoian |
| 9,958,569 B2 | 5/2018 | Morton |
| 10,007,019 B2 | 6/2018 | Morton |
| 10,032,021 B2 | 7/2018 | Pedersen |
| 10,107,783 B2 | 10/2018 | Lionheart |
| 10,126,442 B2 | 11/2018 | Ramsden |
| 10,175,381 B2 | 1/2019 | Morton |
| 10,228,487 B2 | 3/2019 | Mastronardi |
| 10,274,636 B2 | 4/2019 | Tang |
| 10,295,483 B2 | 5/2019 | Morton |
| 10,302,807 B2 | 5/2019 | Yu |
| 10,310,102 B2 | 6/2019 | Ramsden |
| 10,317,566 B2 | 6/2019 | Morton |
| 10,351,967 B2 | 7/2019 | Wang |
| 10,388,818 B2 | 8/2019 | Zhang |
| 10,408,967 B2 | 9/2019 | Morton |
| 10,429,523 B2 | 10/2019 | Ramsden |
| 10,473,795 B2 | 11/2019 | Wang |
| 10,483,077 B2 | 11/2019 | Morton |
| 10,585,207 B2 | 3/2020 | Morton |
| 10,586,324 B2 | 3/2020 | Zhao |
| 10,591,424 B2 | 3/2020 | Morton |
| 10,646,179 B2 | 5/2020 | Xu |
| 10,663,413 B2 | 5/2020 | Li |
| 10,663,616 B2 | 5/2020 | Morton |
| 10,677,943 B2 | 6/2020 | Moore |
| 10,739,491 B2 | 8/2020 | Yang |
| 10,775,320 B2 | 9/2020 | Li |
| 10,826,606 B1 | 11/2020 | Lundberg |
| 10,901,112 B2 | 1/2021 | Morton |
| 10,976,271 B2 | 4/2021 | Morton |
| 2001/0016028 A1 | 8/2001 | Adams |
| 2002/0094064 A1 | 7/2002 | Zhou |
| 2003/0016790 A1 | 1/2003 | Grodzins |
| 2003/0035510 A1 | 2/2003 | Strommer |
| 2003/0043964 A1 | 3/2003 | Sorenson |
| 2003/0068557 A1 | 4/2003 | Kumashiro |
| 2004/0051265 A1 | 3/2004 | Nadeau |
| 2004/0120454 A1 | 6/2004 | Ellenbogen |
| 2004/0141584 A1 | 7/2004 | Bernardi |
| 2004/0252024 A1 | 12/2004 | Huey |
| 2004/0258198 A1 | 12/2004 | Carver |
| 2005/0023479 A1 | 2/2005 | Grodzins |
| 2005/0024199 A1 | 2/2005 | Huey |
| 2005/0100135 A1 | 5/2005 | Lowman |
| 2005/0117683 A1 | 6/2005 | Mishin |
| 2005/0123101 A1 | 6/2005 | Akutsu |
| 2005/0135668 A1 | 6/2005 | Polichar |
| 2005/0157842 A1 | 7/2005 | Agrawal |
| 2005/0169421 A1 | 8/2005 | Muenchau |
| 2005/0198226 A1 | 9/2005 | DeLia |
| 2006/0027751 A1 | 2/2006 | Kurita |
| 2006/0056584 A1 | 3/2006 | Allman |
| 2006/0114477 A1 | 6/2006 | Cox |
| 2006/0140341 A1 | 6/2006 | Carver |
| 2006/0182221 A1 | 8/2006 | Bernhardt |
| 2006/0249685 A1 | 11/2006 | Tanaka |
| 2006/0251211 A1 | 11/2006 | Grodzins |
| 2006/0257005 A1 | 11/2006 | Bergeron |
| 2006/0284094 A1 | 12/2006 | Inbar |
| 2007/0085010 A1 | 4/2007 | Letant |
| 2007/0092066 A1 | 4/2007 | Tkaczyk |
| 2007/0104320 A1 | 5/2007 | Arenson |
| 2007/0140423 A1 | 6/2007 | Foland |
| 2007/0147585 A1 | 6/2007 | Eilbert |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0211851 A1 | 9/2007 | Ogawa |
| 2007/0228284 A1 | 10/2007 | Polichar |
| 2007/0237293 A1 | 10/2007 | Singh |
| 2007/0269013 A1 | 11/2007 | Liu |
| 2007/0280502 A1 | 12/2007 | Paresi |
| 2008/0037707 A1 | 2/2008 | Rothschild |
| 2008/0048872 A1 | 2/2008 | Frank |
| 2008/0056608 A1 | 3/2008 | Spahn |
| 2008/0084963 A1 | 4/2008 | Clayton |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0211431 A1 | 9/2008 | Mishin |
| 2008/0230709 A1 | 9/2008 | Tkaczyk |
| 2008/0260097 A1 | 10/2008 | Anwar |
| 2008/0304622 A1 | 12/2008 | Morton |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0168964 A1 | 7/2009 | Safai |
| 2009/0238336 A1 | 9/2009 | Akery |
| 2009/0245462 A1 | 10/2009 | Agrawal |
| 2009/0257555 A1 | 10/2009 | Chalmers |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0034355 A1 | 2/2010 | Langeveld |
| 2010/0161504 A1 | 6/2010 | Casey |
| 2010/0177868 A1 | 7/2010 | Smith |
| 2010/0177873 A1 | 7/2010 | Chen |
| 2010/0295689 A1 | 11/2010 | Armistead, Jr. |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0204243 A1 | 8/2011 | Bendahan |
| 2011/0235777 A1 | 9/2011 | Gozani |
| 2011/0266643 A1 | 11/2011 | Engelmann |
| 2012/0099710 A1 | 4/2012 | Kotowski |
| 2012/0104276 A1 | 5/2012 | Miller |
| 2012/0116720 A1 | 5/2012 | Klann |
| 2013/0001048 A1 | 1/2013 | Panesar |
| 2014/0185771 A1 | 7/2014 | Morton |
| 2014/0197321 A1 | 7/2014 | Bendahan |
| 2014/0353514 A1 | 12/2014 | Unfors |
| 2015/0036798 A1 | 2/2015 | Morton |
| 2015/0078519 A1 | 3/2015 | Morton |
| 2015/0219775 A1 | 8/2015 | Mcnabb, Jr. |
| 2015/0301220 A1 | 10/2015 | Morton |
| 2015/0355117 A1 | 12/2015 | Morton |
| 2015/0355369 A1 | 12/2015 | Morton |

(56) References Cited

U.S. PATENT DOCUMENTS

| | | |
|---|---|---|
| 2016/0025889 A1 | 1/2016 | Morton |
| 2016/0033674 A1 | 2/2016 | Allman |
| 2018/0252841 A1 | 9/2018 | Grodzins |

FOREIGN PATENT DOCUMENTS

| | | |
|---|---|---|
| AU | 2008267661 B2 | 4/2011 |
| AU | 2008267660 B2 | 6/2011 |
| AU | 2014299147 B2 | 10/2016 |
| CA | 2481596 C | 11/2009 |
| EP | 0077018 A1 | 4/1983 |
| EP | 0146992 A1 | 7/1985 |
| EP | 0417965 A2 | 3/1991 |
| EP | 0919186 A2 | 6/1999 |
| EP | 1413898 A1 | 4/2004 |
| EP | 1642529 A1 | 4/2006 |
| EP | 1328827 B1 | 8/2008 |
| EP | 2102636 B1 | 4/2012 |
| EP | 2019974 B1 | 8/2013 |
| EP | 2593813 B1 | 4/2014 |
| EP | 2075595 B1 | 4/2015 |
| EP | 2047293 B1 | 5/2015 |
| EP | 2705386 B1 | 9/2015 |
| EP | 2113791 B1 | 8/2016 |
| EP | 2883085 B1 | 8/2018 |
| EP | 1749220 B1 | 10/2019 |
| EP | 2287636 B1 | 10/2019 |
| EP | 3077852 B1 | 12/2019 |
| EP | 2778716 B1 | 4/2020 |
| EP | 3474292 B1 | 9/2020 |
| EP | 3505975 B1 | 1/2021 |
| GB | 2255634 A | 11/1992 |
| GB | 2409268 A | 6/2005 |
| GB | 2401766 B | 3/2006 |
| GB | 2424065 A | 9/2006 |
| GB | 2418015 B | 12/2006 |
| GB | 2438317 A | 11/2007 |
| GB | 2445578 B | 1/2009 |
| GB | 2440588 B | 9/2009 |
| GB | 2432094 B | 4/2010 |
| GB | 2463254 B | 7/2010 |
| GB | 2437979 B | 12/2010 |
| GB | 2463707 B | 6/2011 |
| GB | 2472420 B | 2/2012 |
| GB | 2455906 B | 6/2012 |
| GB | 2490513 B | 11/2015 |
| GB | 2499391 B | 11/2015 |
| GB | 2504771 B | 2/2016 |
| GB | 2522017 B | 9/2017 |
| GB | 2520762 B | 4/2018 |
| GB | 2525826 B | 9/2020 |
| GB | 2555564 B | 9/2020 |
| GB | 2560552 B | 9/2020 |
| GB | 2577909 B | 11/2020 |
| GB | 2552538 B | 12/2020 |
| JP | 2000262512 | 9/2000 |
| JP | 2002014059 | 1/2002 |
| JP | 2005124975 | 5/2005 |
| JP | 2005149762 | 6/2005 |
| JP | 2007093501 | 4/2007 |
| WO | 1998055851 A1 | 12/1998 |
| WO | 0033060 A2 | 6/2000 |
| WO | 0159485 A1 | 8/2001 |
| WO | 2001059485 | 8/2001 |
| WO | 2001079798 A2 | 10/2001 |
| WO | 2004010127 A1 | 1/2004 |
| WO | 2005098400 | 10/2005 |
| WO | 2006000020 A1 | 1/2006 |
| WO | 2006036076 A1 | 4/2006 |
| WO | 2006053279 A2 | 5/2006 |
| WO | 2006078691 A2 | 7/2006 |
| WO | 2007035359 A2 | 3/2007 |
| WO | 2007055720 A2 | 5/2007 |
| WO | 2007068933 A1 | 6/2007 |
| WO | 2007103216 A2 | 9/2007 |
| WO | 2008017983 | 2/2008 |
| WO | 2009000020 A1 | 12/2008 |
| WO | 2009027667 A2 | 3/2009 |
| WO | 2009106803 A2 | 9/2009 |
| WO | 2009137698 | 11/2009 |
| WO | 2009143169 A1 | 11/2009 |
| WO | 2010019311 | 2/2010 |
| WO | 2011069024 A1 | 6/2011 |
| WO | 2011091070 A2 | 7/2011 |
| WO | 2011095810 A2 | 8/2011 |
| WO | 2011095942 A2 | 8/2011 |
| WO | 2013116549 A1 | 8/2013 |
| WO | 2013119423 A1 | 8/2013 |
| WO | 2014107675 | 7/2014 |
| WO | 2014121097 A1 | 8/2014 |
| WO | 2014124152 A2 | 8/2014 |
| WO | 2016011205 | 1/2016 |

OTHER PUBLICATIONS

"Oral Program of SORMA West 2008", Jun. 5, 2008, pp. 1-95, XP055167963, Retrieved from the Internet: URL: http://www2.lbl.gov/conferences/SORMA/assets/doc/SORMAOralProgram30May.pdf.

International Search Report for PCT/GB2011/050182, Dec. 28, 2011.

International Search Report for PCT/US09/47292, mailed on Apr. 23, 2012, Rapiscan Laboratories, Inc.

SORMA West 2008 "Intensity Modulated Advanced X-Ray Source (IMAXS) for Homeland Security Applications", p. 74, [online], last updated: May 22, 2008. URL:http://www2.lbl.gov/conferences/SORMA/assets/doc/SORMAOralProgram30May.pdf.

Willem Gerhardus Johannes Langeveld et al: 'Intensity-Modulated Advanced X-Ray Source (IMAXS) for Homeland Security Applications', IEEE Transactions On Nuclear Science, IEEE Service Center, New York, NY, US, vol. 56, No. 3, Jun. 1, 2009 (Jun. 1, 2009), pp. 1288-1291, XP011262712, ISSN: 0018-9499.

Langeveld et al.: "Intensity-modulated Advanced X-ray Source (IMAXS) for Homeland Security Applications", IEEE Transactions on Nuclear Science, vol. 56, No. 3, Jun. 2009.

International Search Report for PCT/IB2011/050469, Jun. 9, 2011.

CRS Report for Congress, Aviation Security Technologies and Procedures: Screening Passengers and Baggage, Oct. 26, 2001, pp. 1-12.

International Search Report for PCT/US2015/040653, Dec. 16, 2015.

International Search Report for PCT/US14/56652, Apr. 27, 2015.

International Search Report for PCT/US14/14198, May 16, 2014.

International Preliminary Report on Patentability for PCT/US2014/014198, Aug. 4, 2015.

International Search Report for PCT/US11/21758; Jul. 7, 2011, Rapiscan Systems Inc.

International Preliminary Report on Patentability for PCT/US11/21758, Jul. 7, 2011.

Written Opinion on Patentability for PCT/US11/21758; Jul. 7, 2011; Rapiscan Systems.

Molchanov P A et al: 'Nanosecond gated optical sensors for ocean optic applications' Sensors Applications Symposium, 2006. Proceedings of The 2006 IEEE Houston, Texas, USA Feb. 7-9, 2006, Piscataway, NJ, USA, IEEE, Feb. 7, 2006 (Feb. 7, 2006) , pp. 147-150, XP010917671 ISBN: 978-0-7803-9580-0.

"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20 [retrieved on Jan. 6, 2010].

International Search Report for PCT/GB09/00575, Apr. 7, 2010.

International Search Report for PCT/GB2009/000497, Jan. 22, 2010.

Smith C. R. et al: 'Application of 450 kV computed tomography to engine blocks with steel liners' Materials Evaluation vol. 65, No. 5, 2007, pp. 458-461, XP055108238.

(56) References Cited

OTHER PUBLICATIONS

International Search Report for PCT/US13/23676, Jun. 28, 2013.
International Search Report for PCT/US13/24191, Rapiscan Systems Inc., mailed on Jun. 25, 2013.
International Search Report for PCT/US2014/010370, May 13, 2014.
International Search Report for PCT/US10/58809; Rapiscan Systems Inc .; Apr. 19, 2011.
International Search Report for PCT/US2014/015126, May 27, 2014.
Written Opinion of the International Searching Authority for PCT/US2014/015126, May 27, 2014.
International Search Report for PCT/US2012/054110, Dec. 24, 2012.

\* cited by examiner

SYSTEMS AND METHODS FOR MONITORING OUTPUT ENERGY OF A HIGH-ENERGY X-RAY SOURCE

CROSS-REFERENCE

The present application relies on U.S. Patent Provisional Application No. 63/453,028, titled "Systems and Methods for Monitoring Output Energy of a High-Energy X-Ray Source" and filed on Mar. 17, 2023, for priority, which is herein incorporated by reference in its entirety.

FIELD

The present specification is related generally to the field of X-ray scanning. More specifically, the present specification is related to systems and methods for enabling monitoring and/or measurement of the output energy of a high-energy X-ray source while scanning an object using a scanning system.

BACKGROUND

To produce a high-energy X-ray beam (over 1 MeV), a linear accelerator (LINAC) is used to direct high-energy electrons onto a target whereupon Bremsstrahlung X-rays are emitted. The emitted X-ray beam has a large continuum of energies which peaks in the keV region yet has a long tail that ends at the maximum energy of the accelerated electrons (the end-point energy).

Typically, the end-point energy of this poly-energetic X-ray beam is measured by obtaining the half-value-layer (HVL), which is defined as a measure of the amount of material (normally steel) that it takes to attenuate the beam down to half of its original value. The process of measuring the HVL involves placing different thicknesses of steel in front of the beam, obtaining measurements of dose/intensity using a detection system, and then fitting the data to extract an HVL value in millimeters (mm). The entire process is time-consuming and difficult to perform on a scanning system during scanning operations since the system cannot be used while this measurement is taking place. In addition, the HVL measuring process does not monitor the output energy continuously which means that no corrections can be applied for energy changes when the scanning system is being used to actually inspect objects for threat or illicit materials.

Accordingly, there is a need for systems and methods that enable measurement and monitoring of the X-ray source output energy while the scanning system is in operation. There is also a need for systems and methods that measure a distribution of energy of an X-ray beam as a function of emission angle without attenuating the X-ray beam.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method of monitoring output energy of an X-ray source while scanning an object in an X-ray scanning system, comprising: positioning a collimation system in front of the X-ray source; positioning or translating the object between the collimation system and a first detector; positioning a second detector between a target of the X-ray source and the object, wherein the second detector has at least first and second detector segments, wherein the first detector segment is positioned to cover only a first angular range of a fan beam of X-rays and the second detector segment is positioned to cover only a second angular range of the fan beam of X-rays, wherein the first angular range and the second angular range do not overlap; operating the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object; generating, by the first detector, X-ray scan data corresponding to the fan beam of X-rays transmitted through the object; generating, by the first detector segment, first energy distribution data; generating, by the second detector segment, second energy distribution data; determining an initial data indicative of a material composition of the object based on the X-ray scan data; determining a value based on a function of the first energy distribution data and the second energy distribution data; and generating a correction factor for the initial data indicative of the material composition of the object based on said value.

Optionally, the determining the value comprises determining a ratio based on the first energy distribution data and the second energy distribution data. Optionally, the method further comprises determining an initial electron energy and an end-point energy of the X-ray source based on the ratio.

Optionally, the second detector is a parallel-plate detector. Optionally, the parallel-plate detector is positioned in front of the collimation system.

Optionally, the electron beam defines a vector, wherein the first angular range occupies an angular region of the fan beam that is offset relative to the vector by less than 10 degrees. Optionally, the second angular range occupies an angular region of the fan beam that is offset relative to the vector by less than 20 degrees, wherein the first angular range and the second angular range do not overlap.

Optionally, the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

Optionally, the second detector is an ion chamber. Optionally, the ion chamber is positioned in the collimation system. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap. Optionally, the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

The present specification also discloses an X-ray scanning system configured to monitor output energy of an X-ray source, comprising: a collimation system positioned in front of the X-ray source; a first detector; an object positioned or translated between the X-ray source and the first detector; a second detector positioned between a target of the X-ray source and the object, wherein the second detector has at least first and second detector segments, wherein the first detector segment is positioned to cover a first angular range of a fan beam of X-rays and the second detector segment is positioned to cover a second angular range of the fan beam of X-rays, wherein the first angular range and the second angular range do not overlap; and a computing device configured to: operate the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object; acquire, using the first detector, X-ray scan data corresponding to the fan beam of X-rays transmitted through the object; acquire, using the first detector segment, first energy distribution data; acquire, using the second detector segment, second energy distribution data; determine an initial data indicative of a material composition of the object based on the X-ray scan data; determine a value based on a function of the first energy distribution data and the second energy distribution data; and generate a correction factor for the initial data indicative of the material composition of the object based on said value.

Optionally, the computing device is configured to determine the value based on the function, wherein the function is a ratio based on the first energy distribution data and the second energy distribution data. Optionally, an initial electron energy and an end-point energy of the X-ray source are determined based on the ratio.

Optionally, the second detector is a parallel-plate detector. Optionally, the parallel-plate detector is positioned in front of the collimation system.

Optionally, the electron beam defines a vector, wherein the first angular range occupies an angular region of the fan beam that is offset relative to the vector by less than 10 degrees. Optionally, the second angular range occupies an angular region of the fan beam that is offset relative to the vector by less than 20 degrees, wherein the first angular range and the second angular range do not overlap.

Optionally, the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

Optionally, the second detector is an ion chamber. Optionally, the ion chamber is positioned in the collimation system. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap. Optionally, the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

The present specification also discloses an X-ray scanning system configured to improve quality of an X-ray scan image, comprising: a high-energy X-ray source; a collimation system positioned in front of the X-ray source; a first detector; an object positioned or translated between the X-ray source and the first detector; a second detector positioned between a target of the X-ray source and the object, wherein the second detector has at least first and second detector segments, wherein the first detector segment is positioned to cover a first angular range of a fan beam of X-rays and the second detector segment is positioned to cover a second angular range of the fan beam of X-rays, wherein the first angular range and the second angular range do not overlap; and a computing device configured to: operate the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object; acquire, using the first detector, X-ray scan data corresponding to the fan beam of X-rays transmitted through the object, wherein the X-ray scan data is rendered as the X-ray scan image on a display; acquire, using the first detector segment, first energy distribution data; acquire, using the second detector segment, second energy distribution data; and apply one or more corrections for material discrimination of the object to the X-ray scan image based on a function of the first energy distribution data and the second energy distribution data.

Optionally, the computing device is further configured to: determine a ratio based on the first energy distribution data and the second energy distribution data; and determine an initial electron energy and an end-point energy of the X-ray source based on the ratio.

Optionally, the second detector is one of a parallel-plate detector or an ion chamber. Optionally, the parallel-plate detector is positioned in front of the collimation system. Optionally, the ion chamber is positioned in the collimation system. Optionally, the electron beam defines a vector, wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1A:
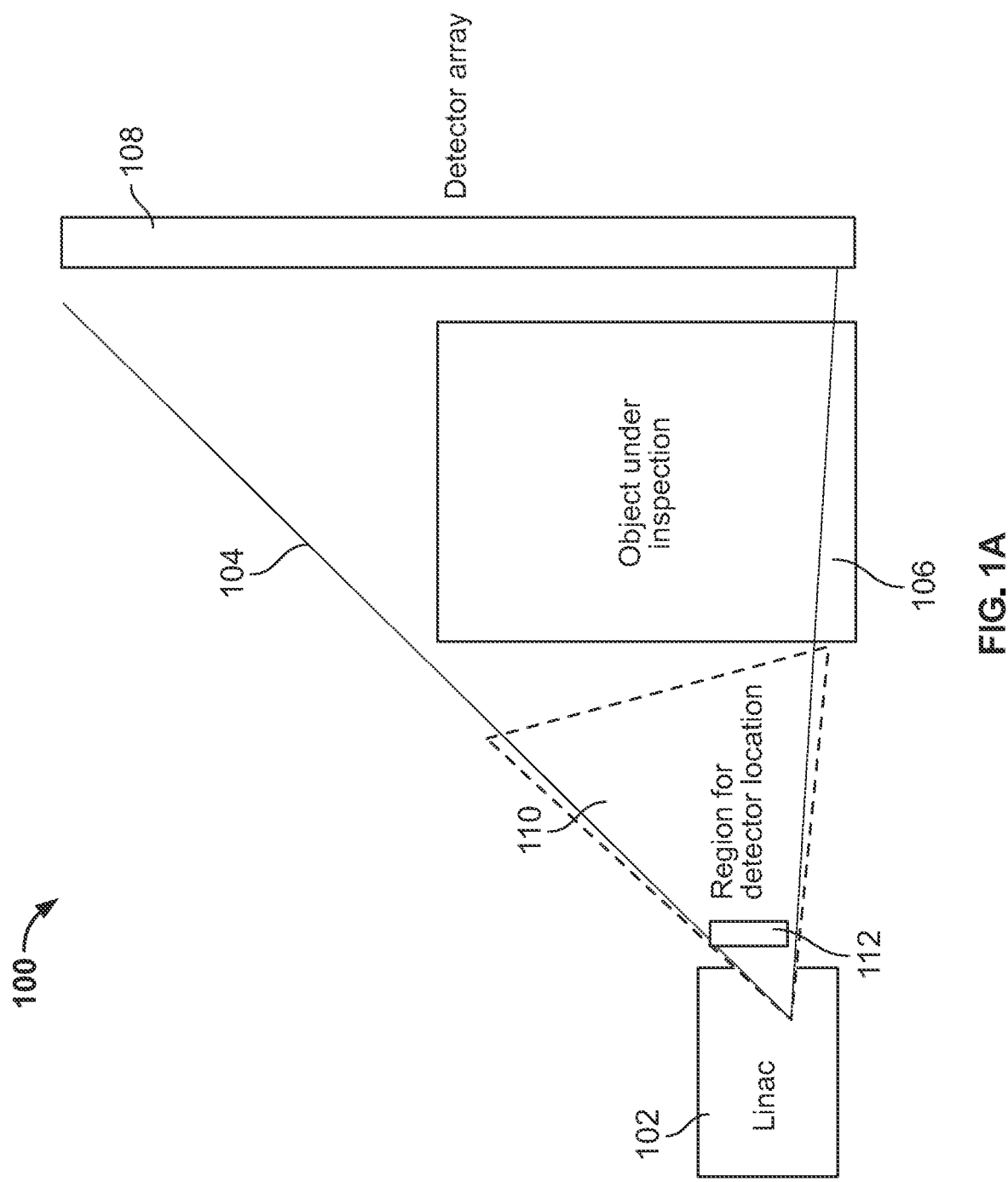
FIG. 1A is a block diagram depicting a high-energy X-ray scanning system, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The term "energy distribution data" refers to the spectral and angular distribution of x-rays emitted from an X-ray source. The energy distribution of the X-rays is based on their distribution about a zero-degree axis, wherein the zero-degree axis is the trajectory of the electrons onto the target in order to produce the X-rays. The distribution is typically presented as intensity as a function of angle. At each angle the intensity is the sum of the X-ray energies, where the distribution or energies can be presented as a spectrum.

The present specification is directed towards a detector that is segmented into at least two different regions and positioned within a high-energy X-ray scanning system having a high-energy X-ray source configured to generate an X-ray beam, in order to measure an output energy of the high-energy X-ray source by measuring an energy distribution of the X-ray beam as a function of angle. In accordance with some aspects, the segmented detector of the present specification, does not measure the source output of the X-ray beam through attenuation of the beam.

Overview

FIG. 1A is a block diagram illustration of a high-energy X-ray scanning system 100, in accordance with some embodiments of the present specification. The system 100 comprises an X-ray source or generator 102 configured to generate a high-energy X-ray beam 104 that illuminates an object under inspection (OUI) 106. In some embodiments, the generated X-ray beam 104 is a vertical fan beam. In embodiments, X-ray energy transmitted through the QUI 106 is received by a first detector 108 that outputs scan data corresponding to the received X-ray energy. In some embodiments, the system 100 is configured as a transmission-based scanning system where the OUI 106 is positioned between the X-ray source 102 and the first detector 108. In some embodiments, the X-ray source 102 is a LINAC (linear accelerator) configured to produce the high-energy X-ray beam 104 of over 1 MeV. In various embodiments, the system 100 may also use a collimation system.

In accordance with aspects of the present specification, a second detector 112 is positioned in a region or area 110. A size of second detector 112 may vary and is based on a position of second detector 112 within area 110. Detector 112 is sized and positioned such that it covers the angular range of X-ray fan beam generated by source 102. The size of second detector 112 is relatively small (when compared with first detector 108) as it is positioned closer to source 102. The farther detector 112 is positioned from source 102 within region 110, the larger the size of detector 112. In addition, in embodiments, a length of detector 112 varies with its position/distance relative to source 102, whereas a width of detector 112 is based on ta type of detector used. In various embodiments, the region or area 110 corresponds to a zone extending from the target of the X-ray source 102 to the OUI 106. In various embodiments, the second detector 112 may be positioned anywhere from right at the X-ray source 102 to right at the QUI 106. In embodiments, the second detector 112 is positioned as close to the X-ray source 102 as practically possible in order to ensure that a) a scanning operation performed by the X-ray source 102 does not interfere with the second detector 112, b) the X-ray beam 104 is constantly being detected and monitored by the second detector 112, c) an impact of the second detector 112 on the X-ray beam 104 is as little as possible so as not to interfere with the scanning operations (that is, the second detector 112 does not interfere with the collimation/shielding and/or any mechanical movement that may be required of the system 100), and d) the association of the X-ray source 102 and the second detector 112 remains compact.

Accordingly, in some embodiments, the second detector 112 is placed either directly in front of the target of the X-ray source 102 or within a collimation system (not shown) before the X-ray beam 104 is attenuated. Further, to prevent alteration of the X-ray beam 104 through attenuation, it is preferred that the second detector 112 be fabricated to be compact, lightweight and positioned such that it attenuates as little as possible of the X-ray beam 104. It should be noted that attenuating the X-ray beam 104 as little as practically possible means that the presence of the second detector 112 will not affect the imaging capabilities of the scanning system 100.

Consequently, in one embodiment, the second detector 112 is an ion chamber with at least two detection chambers. In an embodiment, the at least two detection chambers are electronically isolated. The at least two detection chambers preferably encompass at least two different angular ranges of the X-ray beam 104. In another embodiment, the second detector 112 is a parallel-plate detector with at least two pairs of electronically isolated detector plates. The at least two pairs of detector plates preferably cover at least two different angular ranges of the X-ray beam 104.

In embodiments, a size of the second detector 112 may depend on the scanning system 100 in which it is being deployed in and the type of detector used. Thus, an ion chamber may be placed very close to the target as it is compact, whereas a parallel-plate detector needs to be placed farther away from the target and after a collimator that is used to collimate the generated X-rays into the fan beam 104 so that it can pass between the plates. It should be noted that both detector types must cover enough of the X-ray beam 104 to obtain the requisite energy distribution resolution on their segmented bodies. The main region that the energy distribution changes for 6/4 MeV LINACS is in the range of 0 to 15 degrees. Consequently, covering this angular range at a distance that is practically possible with the choice of detector being used, defines the detector size.

At least one computing device (that implements one or more modules, engines or applications) is in data communication with the system 100 and is configured to acquire a plurality of scan signals of the OUI 106 in order to generate and display radiographic scan image on an associated display screen. The energy distribution data generated, corresponding to the second detector 112 (comprising at least two electronically isolated ion detection chambers or at least two pairs of electronically isolated parallel-plate detectors), is also acquired by the at least one computing device for determining an initial electron energy and an end-point energy of the X-ray beam 104 and applying corrections to the resulting radiographic scan image based on the acquired energy distribution data.

In some embodiments, the system 100 is a dual-energy X-ray scanning system configured to perform material discrimination. The energy distribution data is monitored in order to determine the end-point energy of each of the two energies of the dual-energy X-ray scanning system. Changes in the output of the X-ray source 102 may affect the end-point energies and, therefore, the material discrimination capabilities of the system. The at least one computing device is configured to use the determined end-point energies to apply corrections to each of the two energies in order to improve the material discrimination capabilities of the system.

Parallel-Plate Detector 112

Figure 1B:
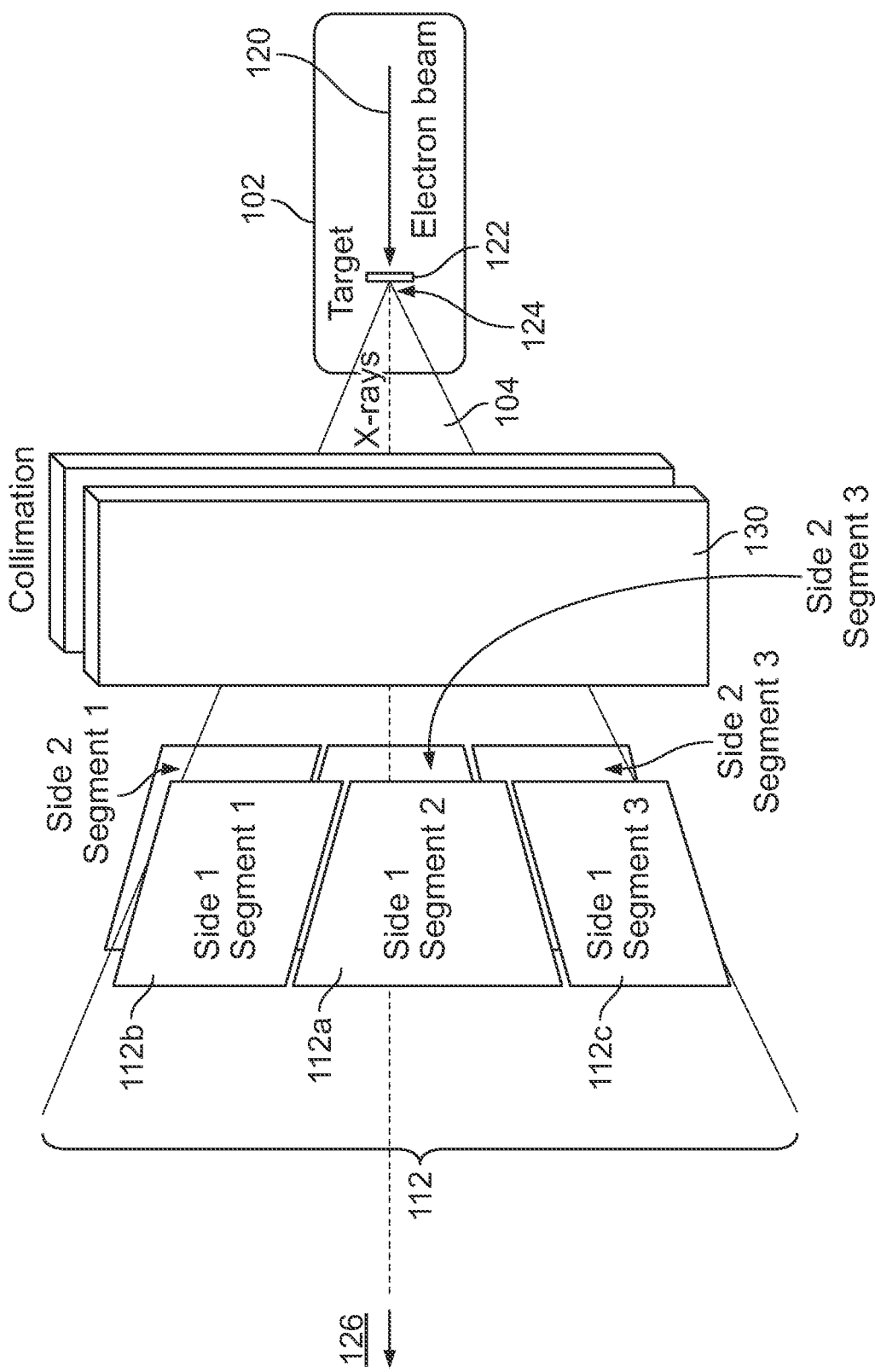
FIG. 1B is a block diagram showing a portion of the high-energy X-ray scanning system of FIG. 1A in which a parallel-plate detector with three segments is deployed, in accordance with some embodiments of the present specification.

FIG. 1B illustrates an enlarged detail portion of the high-energy X-ray scanning system 100, in accordance with some embodiments of the present specification. As shown, an electron beam 120 strikes a target 122 (of the X-ray source 102) at a datum or focal point 124 thereby generating X-rays. A collimation system 130, positioned in front of the X-ray source 102, is configured to shape the generated X-rays into vertical fan X-ray beam 104. In various embodiments, the vertical fan beam 104 has a width of a few millimeters near the X-ray source 102, and a vertical angle ranging between 30 to 80 degrees, depending on the geometry of the system 100.

In accordance with an embodiment, the second detector 112, configured as a parallel-plate detector (hereinafter also referred to by the numeric reference 112), is positioned in front of (in the direction of the electron beam 120) the collimation system 130. It should be appreciated that scanning of objects beyond the collimation system 130 is not affected by the parallel-plate detector 112 and the X-ray beam 104 can be continuously monitored by the parallel-plate detector 112 during scanning operations. In embodiments, the collimation system 130 is configured such that it only allows a thin fan beam 104 to pass through which can then pass cleanly between the parallel plates of the detector 112 such that the fan beam 104 is un-attenuated by the detector 112. The ionization that occurs between the parallel plates occurs naturally as the X-rays pass through the air between the parallel plates, the only difference being that the charged particles are directed towards the positive/negative plates due to an electric field or potential difference being applied to the parallel plates. None of this affects the X-ray beam 104 (in fact, if the X-ray beam 104 were attenuated it would affect the energy spectrum of the beam. Significant attenuation would then need to be accounted for while generating scan images). This is advantageous as corrections to a resulting radiographic image can be made from the energy distribution data obtained from the parallel-plate detector 112, which leads to an improvement in image quality. The air, that the X-ray beam 104 passes through between the detecting plates, is ionized. The resulting ionized particles are detected in order to generate signals corresponding to the energy distribution data of the X-ray beam 104.

Figure 2:
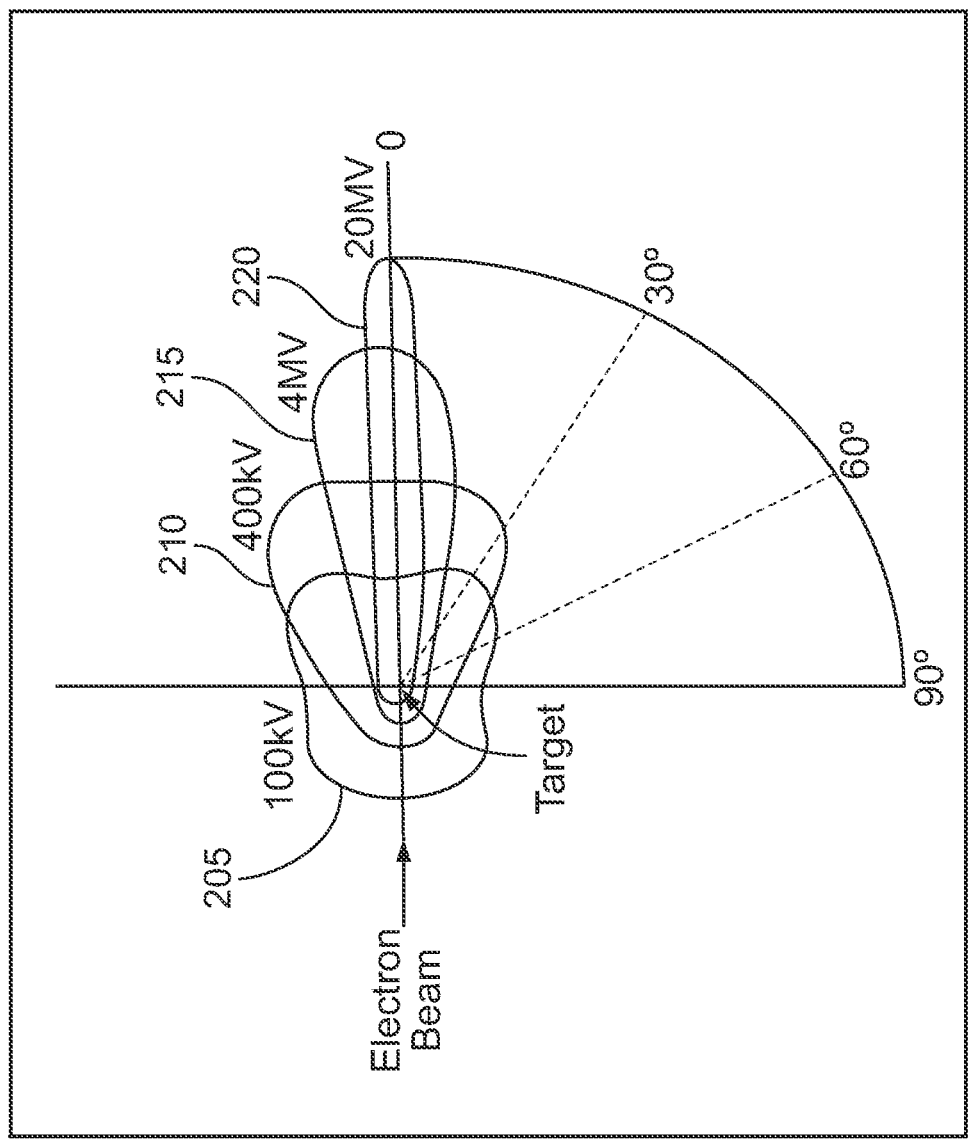
FIG. 2 is a schematic illustration showing a spatial distribution of X-ray photons caused by Bremsstrahlung around a thin target.

For Bremsstrahlung X-ray beams there is a strong correlation between energy and angular distribution of the intensity. FIG. 2 is a schematic illustration of a spatial distribution of X-ray photons caused by Bremsstrahlung around a thin target. As shown in a first plot 205, when the incident electron beam is ≤100 KeV, the resultant photons are emitted equally in all directions. As the energy of the incident radiation is increased, the angular distribution of the Bremsstrahlung radiation beam becomes more "forward peaked" as can be seen from second plot 210, third plot 215, and fourth plot 220.

Figure 3:
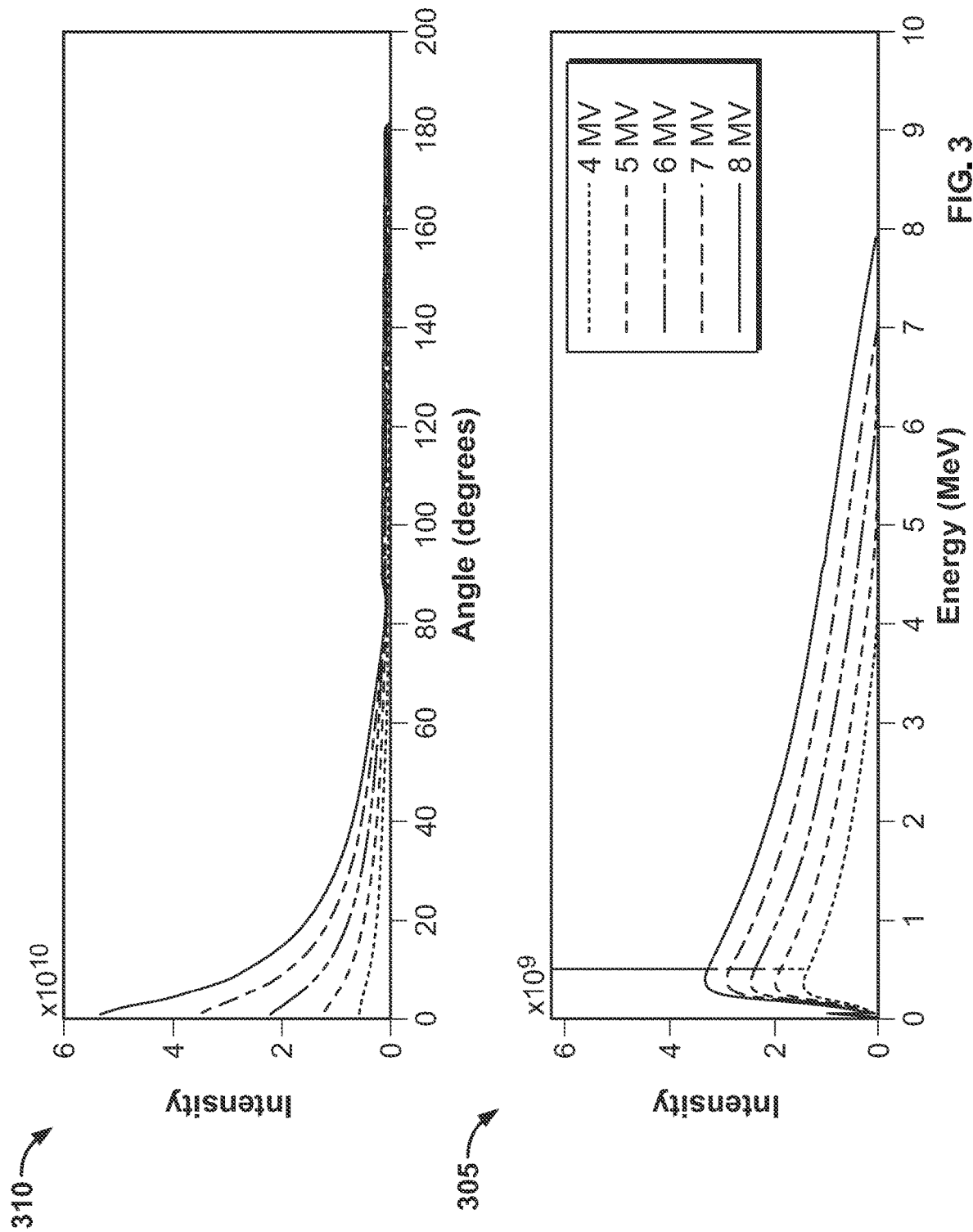
FIG. 3 shows a first plot of energy spectra for Bremsstrahlung X-rays produced with a plurality of electron beams and a second plot of intensity distributions as a function of angle for the same plurality of electron beams, in accordance with some embodiments of the present specification.

Referring to FIG. 3, a first graph 305 shows energy spectra for Bremsstrahlung X-rays produced with a plurality of electron beams accelerated from 4 to 8 MV, and a second graph 310 shows, for the plurality of electron beams, intensity distributions as a function of angle. The higher in energy the electrons are accelerated the more forward-focused or forward-peaked the resultant X-ray beam becomes. Referring to the first graph 305 and second graph 310, the greatest difference in the intensity of the X-ray beams occurs within an angular range of 0 to 40 degrees, where 0 degrees corresponds to the direction of the accelerated beam of electrons (electron beam 120 of FIG. 1B). Therefore, in accordance with some aspects of the present specification, in order to obtain a measure of an angular distribution of energy, the parallel plates of a parallel-plate detector 112 are segmented to form two or more pairs of plates (segments of a first side and segments of a second side parallel to the first side) which cover different angular ranges and are electronically isolated from each other, therefore, yielding independent signals. Referring to FIG. 1B, three segments 112a, 112b and 112c of the first side are shown, which have correspondingly parallel three segments of the second side (partially seen in FIG. 1B).

Referring back to FIG. 1B, in embodiments, a direction 126 of the electron beam 120 forms a vector which may also be defined as corresponding to a 0-degree angle direction of the X-ray beam 104 emanating from target 122 and a plurality of energy distribution data is measured with respect to this vector and the focal point 124.

First Configuration of the Parallel-Plate Detector 112

Figure 1C:
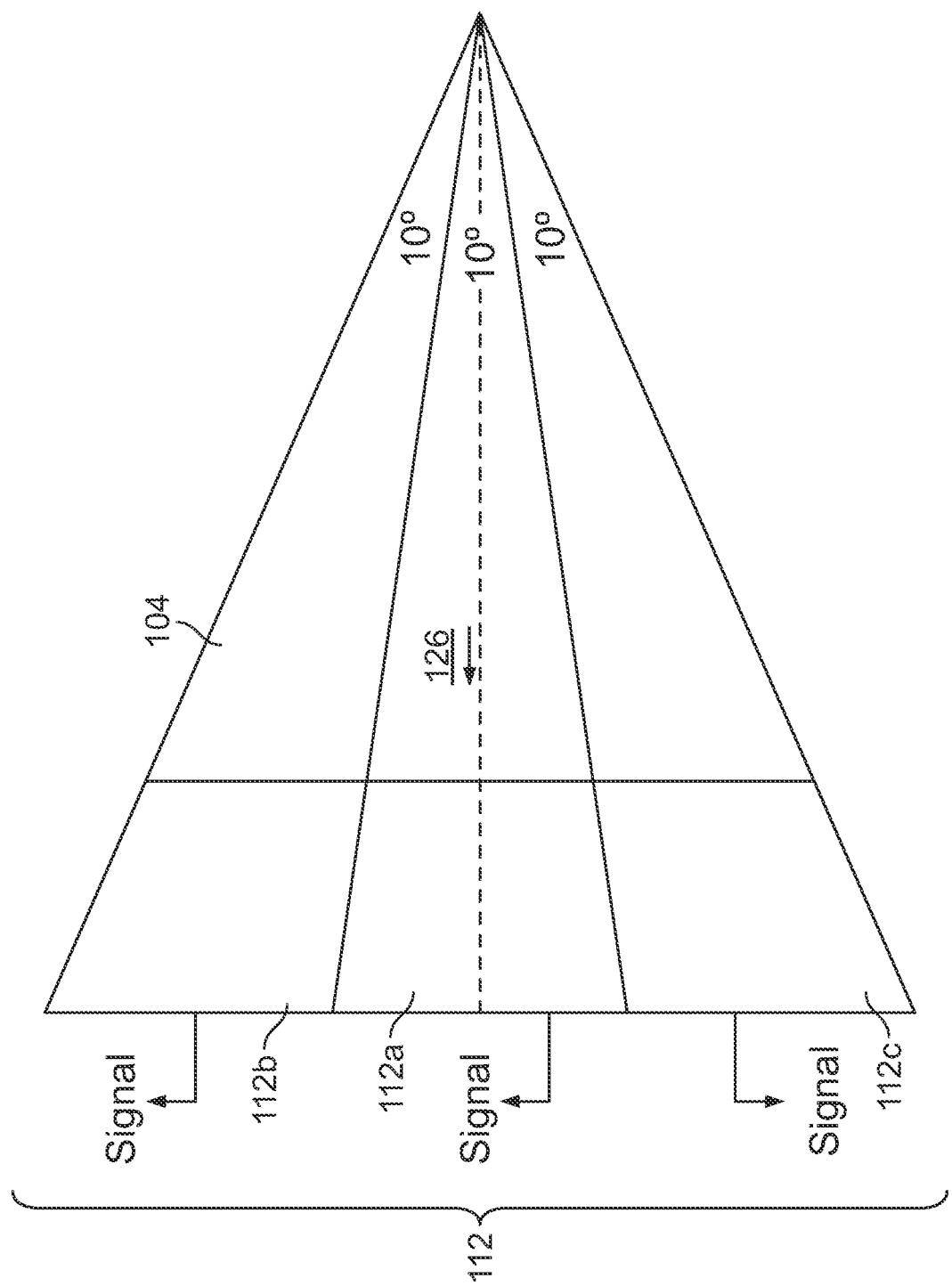
FIG. 1C shows a segmented detector that is positioned to measure energy distribution of an X-ray beam as a function of angle, in accordance with some embodiments of the present specification.

Referring now to FIGS. 1B and 1C, in some embodiments, the parallel-plate detector 112 is segmented into a first parallel plate pair 112a, a second parallel plate pair 112b, and a third parallel-plate pair 112c. In embodiments, each of the parallel-plate pairs are electronically isolated as described above. The first parallel-plate pair 112a (that is, the middle parallel-plate pair) corresponds to the vector of the electron beam, at 0-degree angle and is positioned such the first parallel-plate pair 112a covers an angular range of −5 degrees to +5 degrees (less than 10 degrees offset relative to the vector) of the X-ray beam 104 with reference to the 0-degree angle, wherein the 0-degree angle corresponds to the direction of the electron beam 120. The second parallel-plate pair 112b (that is, the upper parallel-plate pair) is positioned such that the second parallel-plate pair 112b covers an angular range from +5 degrees to +15 degrees (less than 20 degrees offset relative to the vector). The third parallel-plate pair 112c (that is, the lower parallel-plate pair) is positioned such that the third parallel-plate pair 112c covers an angular range from −5 degrees to −15 degrees (less than 20 degrees relative to the vector). Further, the angular ranges of the first, second, and third parallel plate pairs 112a, 112b, and 112 c, do not overlap. Thus, in some embodiments each of the first, second and third parallel-plate pairs 112a, 112b, 112c covers an angular range of up to 10 degrees relative to the vector formed by the electron beam, in a symmetrical configuration.

In alternate embodiments, each of the first, second and third parallel-plate pairs 112a, 112b, 112c may cover a non-overlapping angular range from 5 degrees to 20 degrees. It should be appreciated that the size and geometry of the angles covered is dependent on the scanning system and its geometry, which, in turn, will depend on the application of the X-ray source.

The first parallel-plate pair 112a is configured to generate first energy distribution data of the X-ray beam 104 corresponding to the angular range of +/−5 degrees with reference to the 0-degree angle. The second parallel-plate pair 112b is configured to generate second energy distribution data of the X-ray beam 104 corresponding to the angular range from +5 degrees to +15 degrees. The third parallel-plate pair 112c is configured to generate third energy distribution data of the X-ray beam 104 corresponding to the angular range from −5 degrees to −15 degrees. A value is calculated based on a function of at least two of the first, second and third energy distribution data. In some embodiments, the function comprises a ratio calculated using at least two of the first, second and third energy distribution data. In some other embodiments, the function comprises using an average of the second and the third energy distribution data, and obtaining a ratio using the first energy distribution data and the average of the second and third energy distribution data. The ratio can provide a measure of the intensity distribution, which is further compared to theoretical data to obtain an energy of the beam. The comparison is monitored to identify changes that are corrected, using a simple multiplication factor, or a more complex function that takes into account the energy distribution of the beam. In embodiments, it should be noted that "theoretical data", as used throughout the specification, refers to the expected energy measurements based on the source configuration. The value is then used to calculate a correction factor for the initial data indicative of the material composition of the object based on said value.

Second Configuration of the Parallel-Plate Detector 112

Figure 1D:
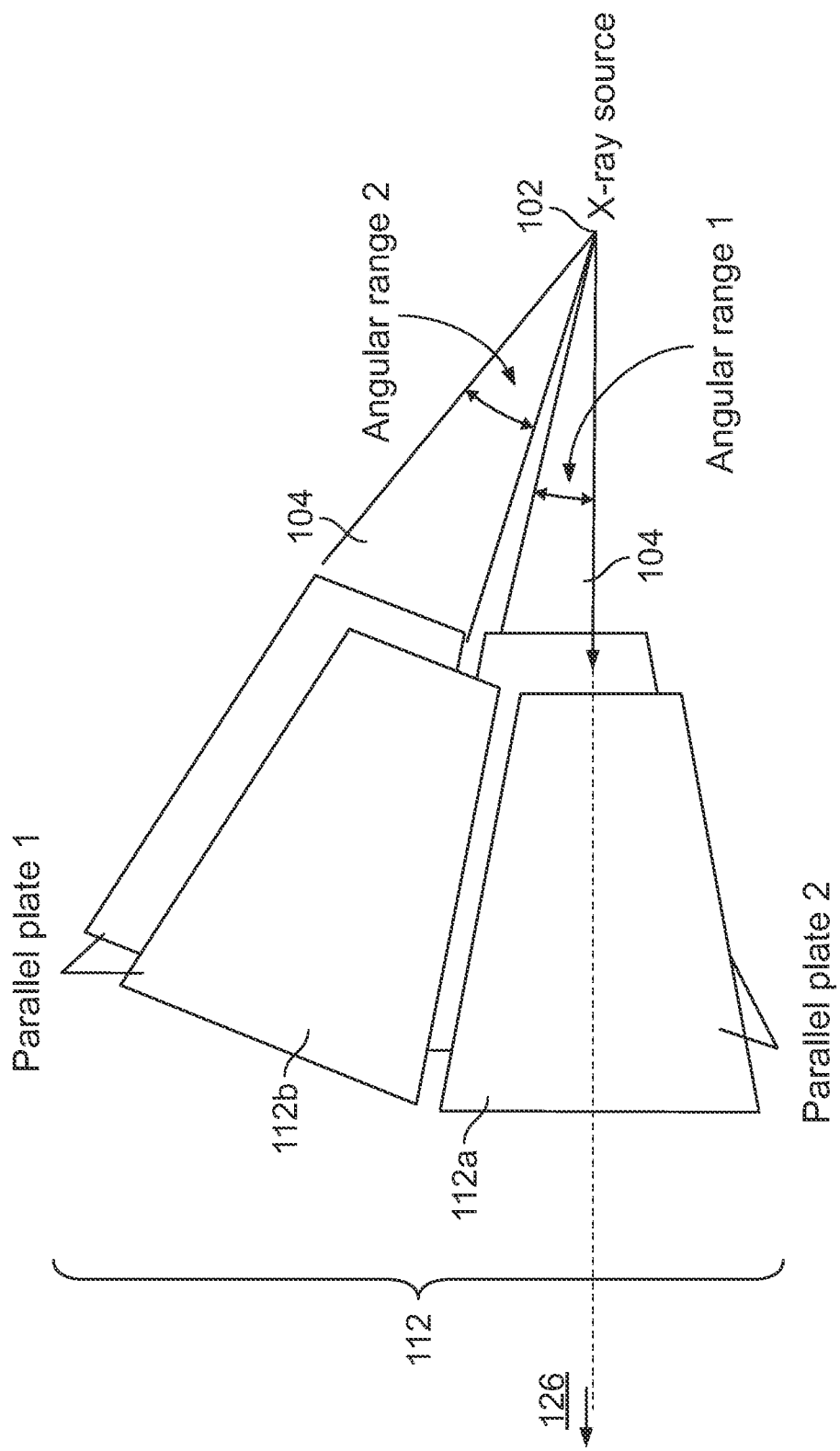
FIG. 1D is a block diagram showing a portion of the high-energy X-ray scanning system of FIG. 1A in which a parallel-plate detector with two segments is deployed, in accordance with some embodiments of the present specification.

Referring now to FIG. 1D, in some embodiments, the parallel-plate detector 112 is segmented into an electronically isolated first parallel plate pair 112a and an electronically isolated second parallel-plate pair 112b. The first parallel-plate pair 112a (that is, the lower parallel-plate pair in this embodiment) corresponds to the vector formed by the electron beam 120, which is also herein defined as a 0-degree angle and is positioned such the first parallel-plate pair 112a covers an angular range of +/−5 degrees with reference to the 0-degree angle (less than 10 degrees relative the vector). The second parallel-plate pair 112b (that is, the upper parallel-plate pair in this embodiment) is positioned such that the second parallel-plate pair 112b covers an angular range from +5 degrees to +15 degrees (less than 20 degrees relative to the vector). Thus, each of the first and second parallel-plate pairs 112a, 112b covers an angular range of 10 degrees. The angular ranges covered by each of the first and second parallel-plate pairs 112a, 112b do not overlap. In alternate embodiments, each of the first parallel plate pair 112a and second parallel-plate pair 112b may cover an angular range from 5 degrees to 20 degrees. It should be appreciated that the size and geometry of the angles covered is dependent on the scanning system and its geometry, which, in turn, will depend on the application of the X-ray source.

The first parallel-plate pair 112a is configured to generate first energy distribution data of the X-ray beam 104 corresponding to the angular range of +/−5 degrees with reference to the 0-degree angle. The second parallel-plate pair 112b is configured to generate second energy distribution data of the X-ray beam 104 corresponding to the angular range from +5 degrees to +15 degrees. A value is calculated based on a function of at least two of the first and the second energy distribution data. In some embodiments, the function comprises a ratio that is calculated using the first and the second energy distribution data, resulting in a value that corresponds to an initial electron energy and an end-point energy of the X-ray beam 104. The ratio can provide a measure of the intensity distribution, which is further compared to theoretical data to obtain an energy of the beam. The comparison is monitored to identify changes that are corrected, using a simple multiplication factor, or a more complex function that takes into account the energy distribution of the beam. The value is then used to calculate a correction factor for the initial data indicative of the material composition of the object based on said value.

Third Configuration of the Parallel-Plate Detector 112

In some embodiments, the parallel-plate detector 112 is segmented into an electronically isolated first parallel plate pair 112a and an electronically isolated third parallel-plate pair 112c. The first parallel-plate pair 112a (that is, the upper parallel-plate pair in this embodiment) corresponds to vector formed by the electron beam 120, which is also herein defined as a the 0-degree angle and is positioned such the first parallel-plate pair 112a covers an angular range of +/−5 degrees with reference to the 0-degree angle (less than 10 degrees relative the vector), wherein the 0-degree angle corresponds to the direction of the electron beam 120. The third parallel-plate pair 112c (that is, the lower parallel-plate pair in this embodiment) is positioned such that the second parallel-plate pair 112c covers an angular range from −5 degrees to −15 degrees (less than 20 degrees relative the vector). Thus, each of the first and third parallel-plate pairs 112a, 112c covers an angular range of 10 degrees. The angular ranges covered by each of the first and third parallel-plate pairs 112a, 112c do not overlap. In alternate embodiments, each of the first and third parallel-plate pairs 112a, 112c may cover an angular range from 5 degrees to 20 degrees. It should be appreciated that the size and geometry of the angles covered is dependent on the scanning system and its geometry, which, in turn, will depend on the application of the X-ray source.

The first parallel-plate pair 112a is configured to generate first energy distribution data of the X-ray beam 104 corresponding to the angular range of +/−5 degrees with reference to the 0-degree angle. The third parallel-plate pair 112c is configured to generate third energy distribution data of the X-ray beam 104 corresponding to the angular range from −5 degrees to −15 degrees. A value is calculated based on a function of at least one of the first and the third energy distribution data. In some embodiments, the function comprises a ratio that is calculated using the first and the third energy distribution data, resulting in a value that corresponds to an initial electron energy and an end-point energy of the X-ray beam 104. The ratio can provide a measure of the intensity distribution, which is further compared to theoretical data to obtain an energy of the beam. The comparison is monitored to identify changes that are corrected, using a simple multiplication factor, or a more complex function that takes into account the energy distribution of the beam. The value is then used to calculate a correction factor for the initial data indicative of the material composition of the object based on said value.

By obtaining energy distribution data of the X-ray beam 104 for at least two different angular positions and calculating a function of the corresponding two energy distribution data, a value can be extracted that corresponds to an initial electron energy and an end-point energy of the X-ray beam 104.

Ion Detection Chambers 112'

Figure 1E:
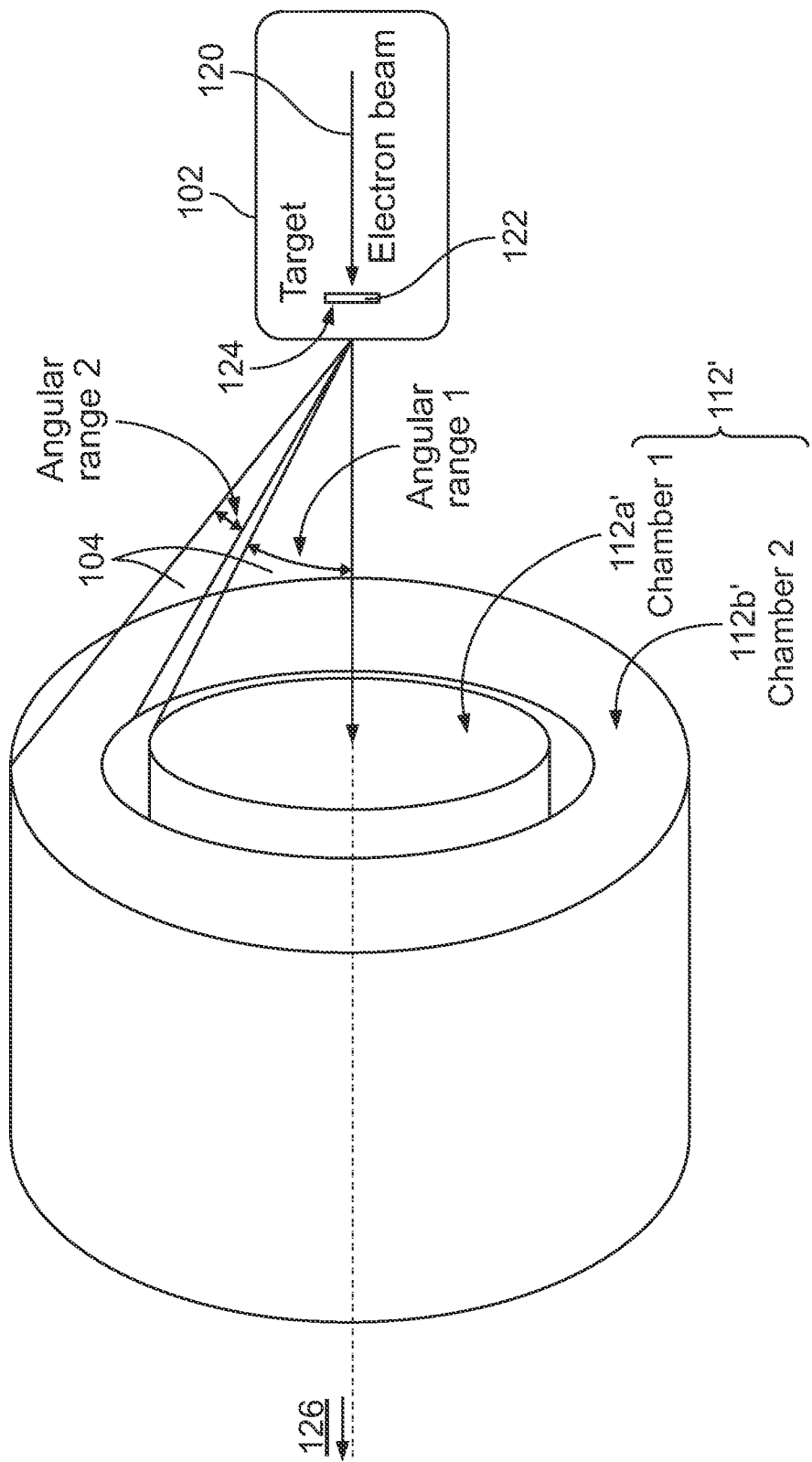
FIG. 1E is a block diagram showing a portion of the high-energy X-ray scanning system of FIG. 1A in which an ion chamber detector with two segments is deployed, in accordance with some embodiments of the present specification.

Referring now to FIG. 1E, in accordance with alternate embodiments, the second detector 112 is configured as an ion chamber detector (hereinafter referred to by the numeric reference 112'). In some embodiments, the ion chamber detector 112' is positioned within the collimation system 130. It should be appreciated that scanning of objects beyond the collimation system 130 is not affected by the ion chamber detector 112' and the X-ray beam 104 can be continuously monitored by the ion chamber detector 112' during scanning operations.

As discussed earlier, with reference to FIGS. 2 and 3, a) as the energy of the incident radiation is increased, the angular distribution of the Bremsstrahlung radiation beam becomes more "forward peaked" and b) the greatest difference in the intensity of the X-ray beams occurs within an angular range of 0 to 40 degrees, where 0 degrees corresponds to the direction of the accelerated beam of electrons (electron beam 120 of FIG. 1B). Therefore, in accordance with some aspects of the present specification, in order to obtain a measure of an angular distribution of energy, the ion chambers of an ion chamber detector are segmented to form two or more ion chambers which cover different angular ranges and are electronically isolated from each other, therefore, yielding independent signals.

In embodiments, the direction 126 of the electron beam 120 corresponds to the 0-degree angle direction of the X-ray beam 104 emanating from the target 122 and a plurality of energy distribution data is measured with respect to this 0-degree angle direction and the focal point 124.

In various embodiments, the ion chamber detector 112' comprises at least two electronically isolated ion chambers positioned in the collimation system 130 of the scanning system 100.

An Exemplary Configuration of the Ion Chamber Detector 112'

In some embodiments, the ion chamber detector 112' is segmented into an electronically isolated first ion chamber 112a' and an electronically isolated second ion chamber 112b'. A first radius of first ion chamber 112a' can range from x to y, whereas a second radius of an outer surface of second ion chamber 112b' can range from x to y and thickness of second ion chamber 112b' can range from x to y. In some embodiments, the first ion chamber 112a' is cylindrical while the second ion chamber 112b' is tube shaped. In some embodiments, the first ion chamber 112a' is placed or positioned coaxially inside the inner radius of the second ion chamber 112b' so that the first and second ion chambers 112a', 112b' are electronically isolated from each other. The first ion chamber 112a' is positioned such that the first ion chamber 112a' covers an angular range of +/−5 degrees (less than 10 degrees relative to the vector) with reference to a 0-degree angle, wherein the 0-degree angle corresponds to the vector of the electron beam 120. The second ion chamber 112b' is positioned such that the second ion chamber 112b' covers an angular range from +5 degrees to +15 degrees (less than 20 degrees relative to the vector). Thus, each of the first and second ion chambers 112a', 112b' covers an angular range of 10 degrees. The angular ranges covered by the first and the second ion chambers do not overlap. In alternate embodiments, each of the first ion chamber 112a' and second ion chamber 112b' may cover an angular range from 5 degrees to 20 degrees. It should be appreciated that the size and geometry of the angles covered is dependent on the scanning system and its geometry, which, in turn, will depend on the application of the X-ray source.

The first ion chamber 112'a is configured to generate first energy distribution data of the X-ray beam 104 corresponding to the angular range of +/−5 degrees with reference to the 0-degree angle. The second ion chamber 112'b is configured to generate second energy distribution data of the X-ray beam 104 corresponding to the angular range from +5 degrees to +15 degrees. A value is calculated based on a function of at least two of the first and the second energy distribution data. In some embodiments, the function comprises a ratio that is calculated using the first and the second energy distribution data, resulting in a value that corresponds to an initial electron energy and an end-point energy of the X-ray beam 104. In some other embodiments, the function comprises using an average of the second and the third energy distribution data, and obtaining a ratio using the first energy distribution data and the average of the second and third energy distribution data. The ratio can provide a measure of the intensity distribution, which is further compared to theoretical data to obtain an energy of the beam. The comparison is monitored to identify changes that are corrected, using a simple multiplication factor, or a more complex function that takes into account the energy distribution of the beam. In embodiments, it should be noted that "theoretical data", as used throughout the specification, refers to the expected energy measurements based on the source configuration. The value is then used to calculate a correction factor for the initial data indicative of the material composition of the object based on said value.

Another Exemplary Configuration of the Ion Chamber Detector 112'

Referring back to FIG. 1E, in some embodiments, the second ion chamber 112b' (that is, the outer ion chamber) is split into first and second segments. The first segment of the second ion chamber 112b' covers a bottom region or portion while the second segment of the second ion chamber 112b' covers a top region or portion. In some embodiments, the first and second segments are respective halves of the second ion chamber 112b'. The first ion chamber 112a' forms a third segment in order to acquire further signal and have more angular range.

In some embodiments, the first ion chamber 112a' corresponding to the third segment covers an angular range of 0 to +5 degrees with reference to the vector, the first segment of the second ion chamber 112b' covers an angular range of +5 degrees to +15 degrees with reference to the vector, while the second segment of the second ion chamber 112b' covers an angular range of +15 degrees to +25 degrees with reference to the vector. In alternate embodiments, each of the first, second and third segments cover an angular range of 5 degrees so that the three segments together cover an angular range of 0 to +15 degrees with reference to the vector.

The first ion chamber 112a' corresponding to the third segment is configured to generate first energy distribution data of the X-ray beam 104 corresponding to the angular range of 0 to +5 degrees (less than 5 degrees relative to the vector) with reference to the 0-degree angle, the first segment of the second ion chamber 112b' is configured to generate second energy distribution data of the X-ray beam 104 corresponding to the angular range of +5 degrees to +15 degrees (less than 15 degrees relative to the vector) with reference to the 0-degree angle, while the second segment of the second ion chamber 112b' is configured to generate third energy distribution data of the X-ray beam 104 corresponding to the angular range of +15 degrees to +25 degrees (less than 25 degrees relative to the vector) with reference to the 0-degree angle. The angular ranges of the first, second and third energy distribution do not overlap.

By obtaining energy distribution data of the X-ray beam 104 for at least two different angular positions and calculating a function of the corresponding at least two energy distribution data, a value can be extracted that corresponds to an initial electron energy and an end-point energy of the X-ray beam 104. In some other embodiments, the function comprises using an average of the second energy distribution data and the third energy distribution data, and obtaining a ratio using the first energy distribution data and the average of the second energy distribution data and third energy distribution data. The ratio can provide a measure of the intensity distribution, which is further compared to theoretical data to obtain an energy of the beam. The comparison is monitored to identify changes that are corrected, using a simple multiplication factor, or a more complex function that considers the energy distribution of the beam.

Method of Monitoring Output Energy of an X-Ray Source

Figure 4:
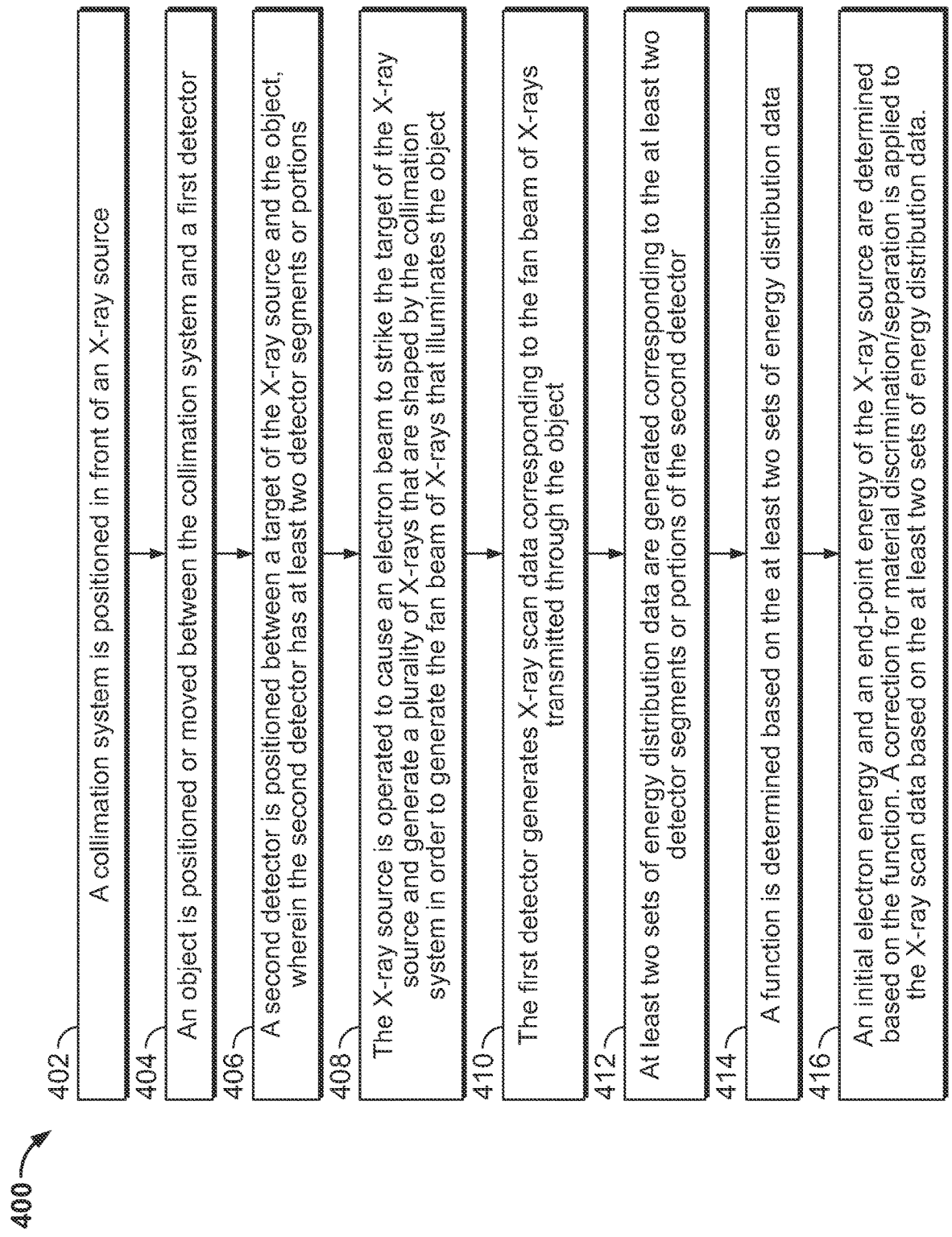
FIG. 4 is a flowchart depicting steps of a method for monitoring output energy of an X-ray source while scanning an object in an X-ray scanning system, in accordance with some embodiments of the present specification.

FIG. 4 is a flowchart of a method 400 of monitoring output energy of an X-ray source while scanning an object using an X-ray scanning system, in accordance with some embodiments of the present specification. At step 402, a collimation system is positioned in front of the X-ray source. At step 404, the object is positioned or moved between the collimation system and a first detector.

At step 406, a second detector is positioned between a target of the X-ray source and the object, wherein the second detector has at least two detector segments or portions. In various embodiments, the second detector is one of a parallel-plate detector or an ion chamber. The parallel-plate detector is positioned in front of the collimation system whereas the ion chamber is positioned in the collimation system.

In some embodiments, the second detector has first and second detector segments. The first detector segment is positioned to cover a first angular range of a fan beam of X-rays and the second detector segment is positioned to cover a second angular range of the fan beam of X-rays. In some embodiments, the first detector segment is positioned to only detect the first angular range of the fan beam of X-rays and the second detector segment is positioned to only detect the second angular range of the fan beam of X-rays, wherein the first detector segment is not configured to detect the second angular range and the second detector segment is not configured to detect the first angular range.

In some embodiments, the second detector has first, second and third detector segments. The first detector segment is positioned to cover a first angular range of the fan beam of X-rays, the second detector segment is positioned to cover a second angular range of the fan beam of X-rays and the third detector segment is positioned to cover a third angular range of the fan beam of X-rays. In some embodiments, the first detector segment is positioned to only detect the first angular range of the fan beam of X-rays, the second detector segment is positioned to only detect the second angular range of the fan beam of X-rays and the third detector segment is positioned to only detect the third angular range of the fan beam of X-rays, wherein the first detector segment is not configured to detect the second and third angular ranges, the second detector segment is not configured to detect the first and third angular ranges and the third detector segment is not configured to detect the first and second angular ranges.

At step 408, in operation, the X-ray source causes an electron beam to strike the target of the X-ray source and generate a plurality of X-rays that are shaped by the collimation system in order to generate a fan beam of X-rays. The fan beam of X-rays illuminates the object.

At step 410, the first detector is configured to generate X-ray scan data corresponding to the fan beam of X-rays transmitted through the object.

A step 412, at least two sets of energy distribution data are generated corresponding to the at least two detector segments or portions of the second detector. In some embodiments, where the second detector has first and second detector segments, the first detector segment generates first energy distribution data and the second detector segment generates second energy distribution data. In some embodiments, where the second detector has first and second detector segments, the first angular range corresponds to an angle ranging from −5 degrees to +5 degrees, the second angular range corresponds to an angle ranging from +5 degrees to +15 degrees, wherein the first and second angular ranges are defined with reference to a 0-degree angle corresponding to a direction of the electron beam. In some embodiments, where the second detector has first and second detector segments, the first angular range corresponds to an angle ranging from −5 degrees to +5 degrees, the second angular range corresponds to an angle ranging from −5 degrees to −15 degrees, wherein the first and second angular ranges are defined with reference to a 0-degree angle corresponding to a direction of the electron beam.

In some embodiments, where the second detector has first, second and third detector segments, the first detector segment generates first energy distribution data, the second detector segment generates second energy distribution data and the third detector segment generates third energy distribution data. In embodiments, where the second detector has first, second and third detector segments, the first angular range corresponds to an angle ranging from −5 degrees to +5 degrees, the second angular range corresponds to an angle ranging from +5 degrees to +15 degrees, the third angular range corresponds to an angle ranging from −5 degrees to −15 degrees, wherein the first, second and third angular ranges are defined with reference to a 0-degree angle corresponding to a direction of the electron beam.

At step 414, a function is calculated/determined based on the at least two sets of energy distribution data. In some embodiments, the function is a ratio. In some embodiments, where the second detector has first and second detector segments, the ratio is determined based on the first and second energy distribution data. In some embodiments, where the second detector has first, second and third detector segments, the ratio is determined based on the first, second and third energy distribution data.

At step 416, an initial electron energy and an end-point energy of the X-ray source are determined based on the function. In some embodiments, a correction for material discrimination of the object is applied to the X-ray scan data based on the at least two sets of energy distribution data. In some embodiments, where the second detector has first and second detector segments, the correction for material discrimination of the object is applied based on the first and second energy distribution data. In some embodiments, where the second detector has first, second and third detector segments, the correction for material discrimination of the object is applied based on the first, second and third energy distribution data.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:
1. A method of monitoring output energy of an X-ray source while scanning an object in an X-ray scanning system, comprising:
positioning a collimation system in front of the X-ray source;

positioning or translating the object between the collimation system and a first detector;

positioning a second detector between a target of the X-ray source and the object, wherein the second detector has at least first and second detector segments, wherein the first detector segment is positioned to cover only a first angular range of a fan beam of X-rays and the second detector segment is positioned to cover only a second angular range of the fan beam of X-rays, wherein the first angular range and the second angular range do not overlap;

operating the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object;

generating, by the first detector, X-ray scan data corresponding to the fan beam of X-rays transmitted through the object;

generating, by the first detector segment, first energy distribution data;

generating, by the second detector segment, second energy distribution data;

determining an initial data indicative of a material composition of the object based on the X-ray scan data;

determining a value based on a function of the first energy distribution data and the second energy distribution data; and generating a correction factor for the initial data indicative of the material composition of the object based on said value.

2. The method of claim 1, wherein the determining the value comprises determining a ratio based on the first energy distribution data and the second energy distribution data.

3. The method of claim 2, further comprising determining an initial electron energy and an end-point energy of the X-ray source based on the ratio.

4. The method of claim 2, wherein the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data.

5. The method of claim 4, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

6. The method of claim 1, wherein the second detector is a parallel-plate detector.

7. The method of claim 6, wherein the parallel-plate detector is positioned in front of the collimation system.

8. The method of claim 1, wherein the electron beam defines a vector, and wherein the first angular range occupies an angular region of the fan beam that is offset relative to the vector by less than 10 degrees.

9. The method of claim 8, wherein the second angular range occupies an angular region of the fan beam that is offset relative to the vector by less than 20 degrees, and wherein the first angular range and the second angular range do not overlap.

10. The method of claim 1, wherein the second detector is an ion chamber.

11. The method of claim 10, wherein the ion chamber is positioned in the collimation system.

12. The method of claim 10, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap.

13. The method of claim 10, wherein the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data.

14. The method of claim 13, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

15. An X-ray scanning system configured to monitor output energy of an X-ray source, comprising:

a collimation system positioned in front of the X-ray source;

a first detector;

an object positioned or translated between the X-ray source and the first detector;

a second detector positioned between a target of the X-ray source and the object, wherein the second detector has at least first and second detector segments, wherein the first detector segment is positioned to cover a first angular range of a fan beam of X-rays and the second detector segment is positioned to cover a second angular range of the fan beam of X-rays, wherein the first angular range and the second angular range do not overlap; and a computing device configured to:
operate the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object;

acquire, using the first detector, X-ray scan data corresponding to the fan beam of X-rays transmitted through the object;

acquire, using the first detector segment, first energy distribution data;

acquire, using the second detector segment, second energy distribution data;

determine an initial data indicative of a material composition of the object based on the X-ray scan data;

determine a value based on a function of the first energy distribution data and the second energy distribution data; and generate a correction factor for the initial data indicative of the material composition of the object based on said value.

16. The X-ray scanning system of claim 15, wherein the computing device is configured to determine the value based on the function, wherein the function is a ratio based on the first energy distribution data and the second energy distribution data.

17. The X-ray scanning system of claim 16, wherein an initial electron energy and an end-point energy of the X-ray source are determined based on the ratio.

18. The X-ray scanning system of claim 15, wherein the second detector is a parallel-plate detector.

19. The X-ray scanning system of claim 18, wherein the parallel-plate detector is positioned in front of the collimation system.

20. The X-ray scanning system of claim 18, wherein the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data.

21. The X-ray scanning system of claim 20, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

22. The X-ray scanning system of claim 15, wherein the electron beam defines a vector, and wherein the first angular range occupies an angular region of the fan beam that is offset relative to the vector by less than 10 degrees.

23. The X-ray scanning system of claim 22, wherein the second angular range occupies an angular region of the fan beam that is offset relative to the vector by less than 20 degrees, and wherein the first angular range and the second angular range do not overlap.

24. The X-ray scanning system of claim 15, wherein the second detector is an ion chamber.

25. The X-ray scanning system of claim 24, wherein the ion chamber is positioned in the collimation system.

26. The X-ray scanning system of claim 24, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap.

27. The X-ray scanning system of claim 24, wherein the second detector has a third detector segment positioned to cover a third angular range of the fan beam of X-rays, wherein the third detector segment generates third energy distribution data, and wherein the value is based on a function of the first energy distribution data, the second energy distribution data and the third energy distribution data.

28. The X-ray scanning system of claim 27, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, the third angular range occupies an angular region of the fan beam that is offset relative to the vector by less than 30 degrees, and wherein the first angular range, the second angular range, and the third angular range do not overlap.

29. An X-ray scanning system configured to improve quality of an X-ray scan image, comprising:
a high-energy X-ray source;
a collimation system positioned in front of the X-ray source;
a first detector;
an object positioned or translated between the X-ray source and the first detector;
a second detector positioned between a target of the X-ray source and the object, wherein the second detector has at least first and second detector segments, wherein the first detector segment is positioned to cover a first angular range of a fan beam of X-rays and the second detector segment is positioned to cover a second angular range of the fan beam of X-rays, wherein the first angular range and the second angular range do not overlap; and
a computing device configured to:
operate the X-ray source to cause an electron beam to strike the target of the X-ray source and generate a plurality of X-rays, wherein the collimation system is configured to shape the plurality of X-rays in order to generate the fan beam of X-rays, and wherein the fan beam of X-rays illuminates the object;
acquire, using the first detector, X-ray scan data corresponding to the fan beam of X-rays transmitted through the object, wherein the X-ray scan data is rendered as the X-ray scan image on a display;
acquire, using the first detector segment, first energy distribution data;
acquire, using the second detector segment, second energy distribution data; and
apply one or more corrections for material discrimination of the object to the X-ray scan image based on a function of the first energy distribution data and the second energy distribution data.

30. The X-ray scanning system of claim 29, wherein the computing device is further configured to:
determine a ratio based on the first energy distribution data and the second energy distribution data; and
determine an initial electron energy and an end-point energy of the X-ray source based on the ratio.

31. The X-ray scanning system of claim 30, wherein the second detector is one of a parallel-plate detector or an ion chamber.

32. The X-ray scanning system of claim 31, wherein the parallel-plate detector is positioned in front of the collimation system.

33. The X-ray scanning system of claim 31, wherein the ion chamber is positioned in the collimation system.

34. The X-ray scanning system of claim 31, wherein the electron beam defines a vector, and wherein the first angular range occupies an angular region of the fan beam that is offset relative to the vector by less than 10 degrees, the second angular range occupies an angular region of the fan beam that is offset relative to the vector by less than 20 degrees, and wherein the first angular range and the second angular range do not overlap.

* * * * *